(12) United States Patent
Yamasaki et al.

(10) Patent No.: US 6,561,610 B2
(45) Date of Patent: May 13, 2003

(54) PRINTING WITH REDUCED OUTLINE BLEEDING

(75) Inventors: Keigo Yamasaki, Nagano-ken (JP); Akito Sato, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 15 days.

(21) Appl. No.: 09/969,514

(22) Filed: Oct. 1, 2001

(65) Prior Publication Data

US 2002/0070990 A1 Jun. 13, 2002

(30) Foreign Application Priority Data

Oct. 5, 2000 (JP) ........................................ 2000-306144
Jan. 23, 2001 (JP) ........................................ 2001-014179
Jun. 27, 2001 (JP) ........................................ 2001-194025

(51) Int. Cl.[7] .............................. B41J 2/205; B41J 2/21
(52) U.S. Cl. .......................................... 347/15; 347/43
(58) Field of Search ...................... 347/15, 43; 358/1.1, 358/3.11

(56) References Cited

U.S. PATENT DOCUMENTS

| 5,136,401 | A | * | 8/1992 | Yamamoto et al. | ......... 358/474 |
| 5,596,352 | A | | 1/1997 | Bliss et al. | |
| 5,633,662 | A | | 5/1997 | Allen et al. | |
| 5,872,896 | A | | 2/1999 | Li et al. | |
| 6,099,104 | A | * | 8/2000 | Sato et al. | ..................... 347/15 |

FOREIGN PATENT DOCUMENTS

| EP | 0628415 A2 | 12/1994 |
| JP | 10-250119 | 9/1998 |

\* cited by examiner

*Primary Examiner*—Thinh Nguyen
(74) *Attorney, Agent, or Firm*—Beyer Weaver & Thomas, LLP

(57) ABSTRACT

Outline bleeding of printed images can be reduced in a printer in which ink dots are formed on a print medium, because the amount of ink contained in the dots for forming boundary lines, which bleed easily, is reduced by skipping some dots or varying the dot size. As a result, texts and other printed images having sharply defined outlines can be printed with high legibility.

126 Claims, 31 Drawing Sheets

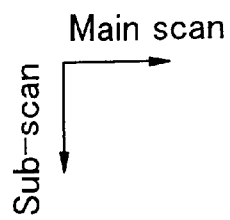
Fig.1(a)
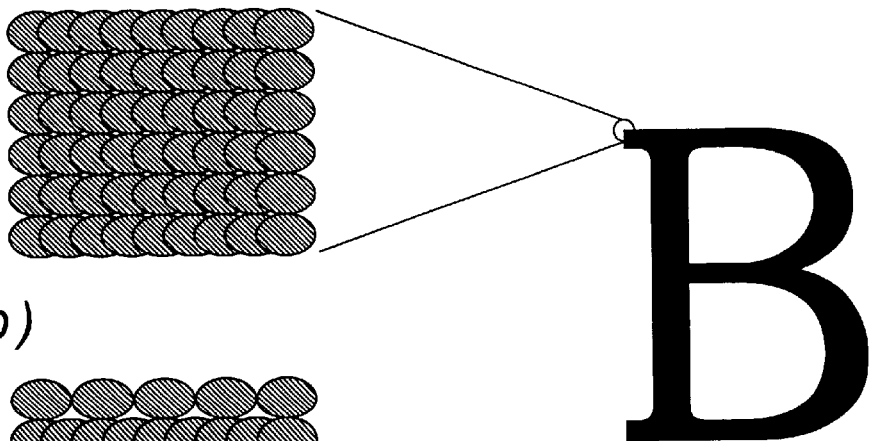
Fig.1(b)
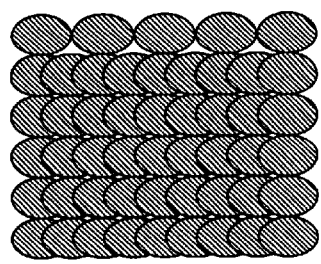
Fig.1(c)
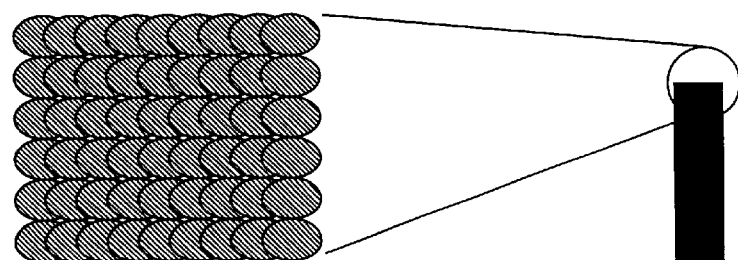
Fig.1(d)
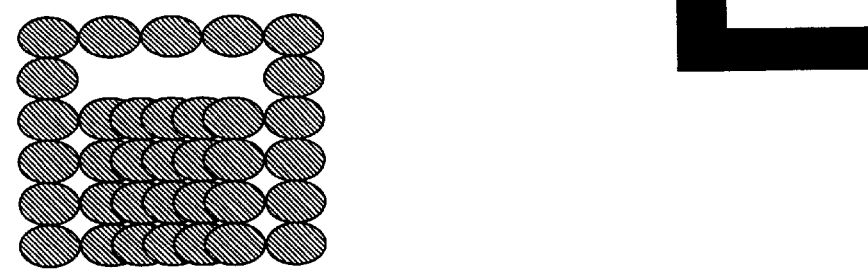

Main scan (x) / Sub-scan (y)

$$\Delta y = \begin{pmatrix} 0 & -1 & 0 \\ 0 & 1 & 0 \\ 0 & 0 & 0 \end{pmatrix}$$

$$\Delta y = \begin{pmatrix} -1 & -k & -1 \\ 0 & 0 & 0 \\ 1 & k & 1 \end{pmatrix}$$

$$\Delta y = \begin{pmatrix} 0 & 1 & 0 \\ 1 & -4 & 1 \\ 0 & 1 & 0 \end{pmatrix}$$

Fig.7(a)
Dot pattern before the process

Fig.7(b)
Filtering results

Fig.7(c)
Extracted contour lines

Fig.7(d)
Flag F0

Fig.7(e)
Dot pattern after the process

Fig.7(f)
Another process example

Fig.10(a)
Halftone data for single main scan before skipping process

| 1 | 2 | 3 | 4 | 5 | 6 | 7 | 8 | 9 | 10 | 11 | 12 |
|---|---|---|---|---|---|---|---|---|----|----|----|
| 0 | 0 | 1 | 1 | 1 | 1 | 1 | 1 | 1 | 1  | 0  | 0  |

Fig.10(b)
Extracted longitudinal contour line data (X)

| 1 | 2 | 3 | 4 | 5 | 6 | 7 | 8 | 9 | 10 | 11 | 12 |
|---|---|---|---|---|---|---|---|---|----|----|----|
| 0 | 0 | 1 | 0 | 0 | 0 | 0 | 0 | 0 | 1  | 0  | 0  |

Fig.10(c)
F1

| 1 | 2 | 3 | 4 | 5 | 6 | 7 | 8 | 9 | 10 | 11 | 12 |
|---|---|---|---|---|---|---|---|---|----|----|----|
| 0 | 1 | 1 | 1 | 1 | 1 | 1 | 1 | 0 | 0  | 0  | 0  |

Fig.10(d)
F2

| 1 | 2 | 3 | 4 | 5 | 6 | 7 | 8 | 9 | 10 | 11 | 12 |
|---|---|---|---|---|---|---|---|---|----|----|----|
| 0 | 0 | 0 | 0 | 1 | 1 | 1 | 1 | 1 | 1  | 1  | 0  |

Fig.10(e)
F1 and F2

| 1 | 2 | 3 | 4 | 5 | 6 | 7 | 8 | 9 | 10 | 11 | 12 |
|---|---|---|---|---|---|---|---|---|----|----|----|
| 0 | 0 | 0 | 0 | 1 | 1 | 1 | 1 | 0 | 0  | 0  | 0  |

Fig.10(f)
Data after first skipping process (X or (F1 and F2))

| 1 | 2 | 3 | 4 | 5 | 6 | 7 | 8 | 9 | 10 | 11 | 12 |
|---|---|---|---|---|---|---|---|---|----|----|----|
| 0 | 0 | 1 | 0 | 1 | 1 | 1 | 1 | 0 | 1  | 0  | 0  |

Fig.13(a)
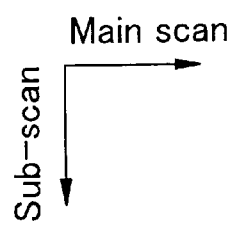
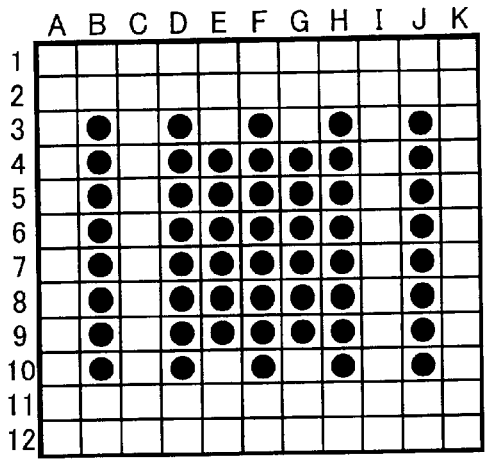
Fig.13(b)
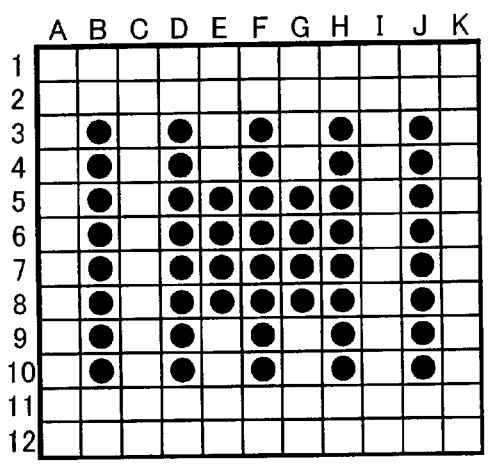
Fig.13(c)
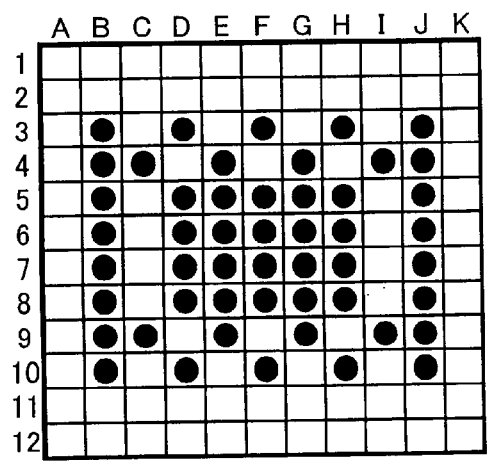

Fig.15
The third working example
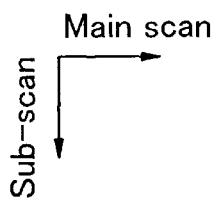
An example of dot skipping in transverse contour line according to resolution
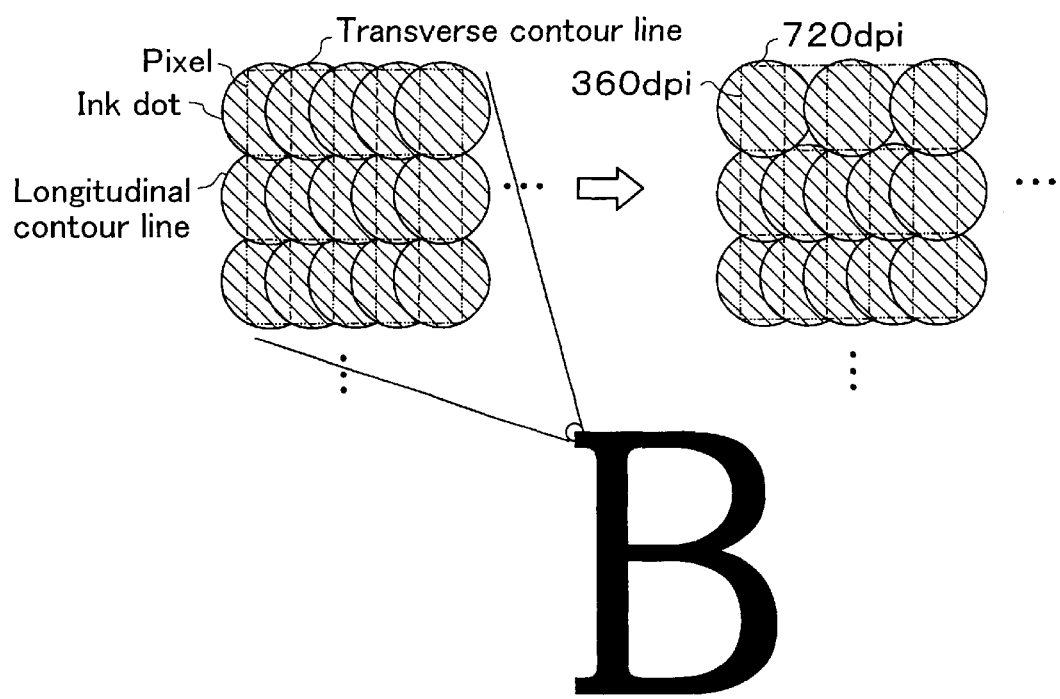

An example of dot skipping in accordance with resolution and nozzle array density Printing flow

Fig. 22

Determination of dot skipping method

| Print medium | Ink color | Resolution (Main scan × Sub-scan) | Transverse contour line | Longitudinal contour line | Dot inscribed in contour line |
|---|---|---|---|---|---|
| Plain paper | Black | 720dpi × 360dpi | ○ | × | ○ |
| | | 360dpi × 720dpi | × | ○ | ○ |
| | | 720dpi × 720dpi | ○ | ○ | ○ |
| | Color | 720dpi × 360dpi | ○ | × | ○ |
| | | 360dpi × 720dpi | × | × | ○ |
| | | 720dpi × 720dpi | ○ | × | ○ |
| High Quality Ink Jet Paper | Black | 720dpi × 360dpi | × | × | × |
| | | 360dpi × 720dpi | × | × | × |
| | | 720dpi × 720dpi | × | × | × |
| | Color | 720dpi × 360dpi | × | × | × |
| | | 360dpi × 720dpi | × | × | × |
| | | 720dpi × 720dpi | × | × | × |

Transverse contour line: contour line parallel to the direction of Main scan
Longitudinal contour line: contour line parallel to the direction of Sub-scan

Fig.27(a)

$$\Delta x = \begin{pmatrix} -1 & 0 & 1 \\ -k & 0 & k \\ -1 & 0 & 1 \end{pmatrix} \qquad \Delta y = \begin{pmatrix} -1 & -k & -1 \\ 0 & 0 & 0 \\ 1 & k & 1 \end{pmatrix}$$

Fig.27(b)

$$\Delta X = \begin{pmatrix} -1 & 0 & 1 \\ -1 & 0 & 1 \\ -1 & 0 & 1 \end{pmatrix} \qquad \Delta Y = \begin{pmatrix} -1 & -1 & -1 \\ 0 & 0 & 0 \\ 1 & 1 & 1 \end{pmatrix}$$

- Large frame shows recording area
- Diagonal hatching shows dummy data
- Crosshatching shows initial pixel Fig.30(a) Outline data Fig.30(b) Result of merely blacking out spaces between outlines Fig.30(c) Result of shifting two pixels to the left Fig.30(d) Result of shifting two pixels to the right Fig.30(e) Result of obtaining logical product of (c) and (d)

Fig.30(f) Result of obtaining logical sum of (a) and (e) → Large dot

Fig.30(g) Result of obtaining exclusive or logical sum of (b) and (f) → Small dot 1: To be recorded
0: To be left unrecorded (skipped)

PRINTING WITH REDUCED OUTLINE BLEEDING

BACKGROUND OF THE INVENTION

1. Field of the Invention

The present invention relates to a technique for printing images on a print medium by ink ejection.

2. Description of the Related Art

Ink-jet printers for forming ink dots into images on print media by ejecting ink droplets are widely used as devices for outputting images created by computers and digital cameras.

When non-picture image such as characters, illustrations, and line drawings are printed by an ink-jet printer, the ink sometimes bleeds along the outlines of the non-picture image. Such ink bleeding is attributed to the fact that the ink ejected into the line-drawing area accumulates without being absorbed by the print medium, and flows out toward the areas not intended to form dot therein.

In particular, ink dots tend to elongate in the direction of main scanning when they are formed while the print head is moved in the direction of main scanning, so contour lines extending parallel to the direction of main scanning are prone to ink accumulation and bleeding. Contour lines extending parallel to the direction of higher resolution are also apt to accumulate ink when different resolutions are set for the directions of main and sub-scan. Not only does such bleeding affect the outline portions, but it sometimes occurs in cases in which differently colored high-concentration regions are brought close together to form an outline.

SUMMARY OF THE INVENTION

Accordingly, an object of the present invention is to reduce ink bleeding in outline portions in a printing device for printing images by ejecting ink droplets.

In order to attain the above and the other objects of the present invention, there is provided a printing control apparatus for generating print data to be supplied to a printing unit to perform printing during main scans. The printing control apparatus comprises: a dot data generator, a contour line extractor, and a dot data adjuster. The dot data generator is configured to generate dot data from image data indicative of a image to be printed, where the dot data representing a state of dot formation in each pixel. The contour line extractor is configured to extract a first type contour line of a specific type image area represented by the dot data, where the first contour line is parallel to a main scan direction, and the specific type image area is composed of pixels at which specific type dots are to be formed. The dot data adjuster is configured to adjust the dot data so as to regularly reduce an amount of ink for forming dots on the first contour line.

Therefore, it is possible to reduce bleeding from the outlines of a printed image, because the amount of ink is regularly reduced for the ink dots needed to form contour lines disposed parallel to the direction of main scanning, where bleeding is apt to occur. As a result, texts and other printed images having sharply defined outlines can be printed with high legibility.

In a preferred embodiment of the invention, the dot data adjuster is configured to adjust the dot data so as to reduce the amount of ink by selectively performing one of dot skipping and dot size reduction, depending on a pixel position of each dot within the specific image area.

This arrangement is advantageous in that sharply defined outlines can be obtained within a range devoid of ink bleeding because the amount of ink can be reduced in a more controlled manner.

In another embodiment, a printing control apparatus for generating print data to be supplied to a printing unit capable of printing images on print medium with multiple print resolution, the printing control apparatus comprising: a dot data generator configured to generate dot data from image data indicative of a image to be printed, the dot data representing a state of dot formation in each pixel; a contour line extractor configured to extract a transverse contour line parallel to a main scan direction of an image area composed of pixels at which a specific type dot to be formed by the dot data, the specific type dot being defined by the fact that a first value is greater than the predetermined first threshold, the first value being obtained by dividing the length of the specific type dot in a main scan direction by the pixel length in the main scan direction, assuming that the specific type dot is formed individually; and a dot data adjuster configured to adjust the dot data so as to regularly reduce an amount of ink for forming dots on the transverse contour line.

In the other embodiment, a printing control apparatus for generating print data to be supplied to a printing unit to perform printing during main scans, the printing unit comprising a print head having a plurality of nozzles and a plurality of ejection driving elements for causing ejection of ink droplets respectively from the plurality of nozzles, each nozzle being adaptable to form a selected one of N different dots having different sizes in one pixel area on the print medium, N being an integer of at least 2, the N different dots including a specific size dot that is one of comparatively large dots among the N different dots; and a dot data generator configured to generate dot data from image data indicative of a image to be printed, the dot data representing a state of dot formation in each pixel; a contour line extractor configured to extract a contour line of a specific type image area represented by the dot data, the specific type image area being composed of pixels at which specific size dots are to be formed; and a dot data adjuster configured to adjust the dot data so as to reduce the amount of ink by reducing dot size when the contour line is formed with the specific size dot.

The present invention can be realized in various forms such as a method and apparatus for printing, a method and apparatus for producing print data for a printing unit, and a computer program product implementing the above scheme.

These and other objects, features, aspects, and advantages of the present invention will become more apparent from the following detailed description of the preferred embodiments with the accompanying drawings.

BRIEF DESCRIPTION OF THE DRAWINGS

FIGS. 1(a)–1(d) are diagrams illustrating the manner in which some of the pixels in a dot pattern are skipped by means of a procedure performed in accordance with a working example of the present invention;

FIGS. 7(a)–(f) are diagrams depicting the manner in which the amount of ink is reduced in accordance with the first working example of the present invention;

FIGS. 10(a)–10(f) are diagrams illustrating the manner in which a first ink rate reduction procedure is performed in accordance with the second working example of the present invention;

FIGS. 13(a)–13(c) are diagrams showing the dot pattern obtained after the amount of ink has been reduced by another skipping method;

FIG. 15 is a diagram depicting an example of skipping performed when print resolution is higher in the direction of main scanning than in the direction of sub-scan;

FIG. 22 is a diagram depicting the specifics defined for the skipping procedure in accordance with the print mode in the third working example of the present invention;

FIGS. 27(a) and 27(b) are diagrams depicting the matrices used in the fourth working example of the present invention as filters for extracting contour lines;

FIGS. 30(a)–30(g) are diagrams depicting the progress of the skipping and fill-in procedures performed in accordance with the fourth working example of the present invention;

DESCRIPTION OF THE PREFERRED EMBODIMENT

Figure 2:
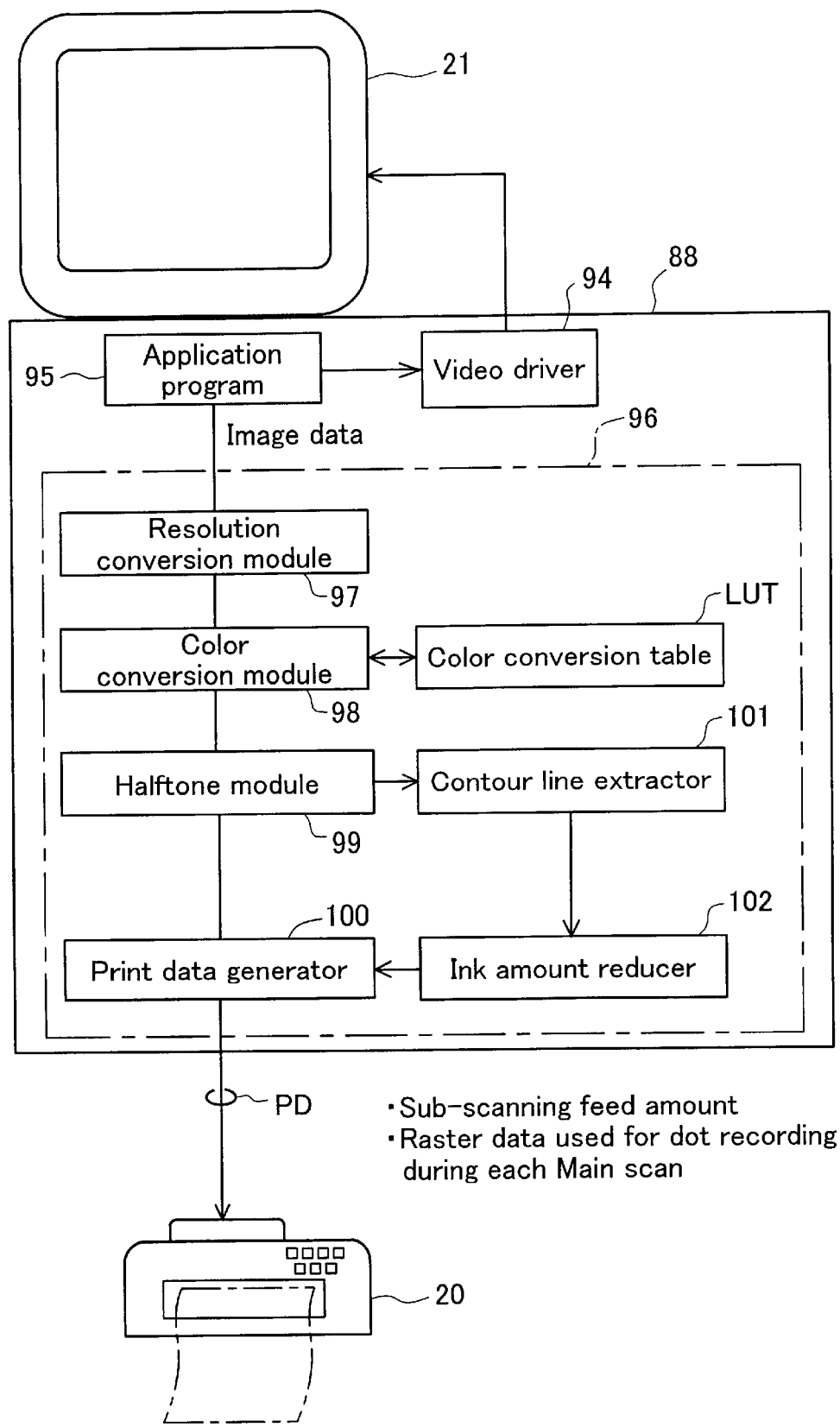
FIG. 2 is a block diagram depicting the structure of a print system configured according to a working example of the present invention.

The present invention is explained in the following sequence based on embodiments.

A. Overview of Embodiments
B. Device Structure
C. First Working Example
D. Second Working Example
E. Third Working Example
F. Fourth Working Example
G. Modifications A. Overview of Embodiments FIG. 1 is a diagram illustrating the manner in which some of the pixels in a dot pattern are skipped by means of a procedure performed in accordance with a working example of the present invention. FIGS. 1a and 1b are diagrams depicting in enlarged form some of the dots forming the letter "B" as a printed image. FIG. 1a depicts the dot pattern existing before the procedure pertaining to the example of the present invention has been performed, whereas FIG. 1b depicts the dot pattern obtained following the procedure. Although in practice all adjacent dot pairs overlap to form solid areas, slightly smaller dots are shown herein for the sake of clarity.

As can be seen in the drawings, the dot pattern processed in accordance with an example of the present invention is configured to some of the dots in the contour lines extending in the direction of main scanning are skipped. Performing this procedure reduces ink bleeding along the contour lines of the letter "B" in the direction of main scanning and yields a sharply defined outline. In the present working example, some of the dots in the contour lines extending in the direction of main scanning are skipped because the contour lines tend to bleed in this direction in the above-described manner.

The reason that contour lines are prone to bleeding in the direction of main scanning is that ink dots tend to be longer in the direction of main scanning than in the direction of sub-scan. This is because a print head ejects ink while moving relative to the print medium in the direction of main scanning, causing ink droplets to also move at a certain speed in this direction in relation to the print medium.

FIGS. 1c and 1d depict in enlarged form some of the dots forming the letter "L" as a printed image. FIG. 1c depicts the dot pattern existing before the procedure pertaining to another example of the present invention has been performed, whereas FIG. 1d depicts the dot pattern obtained following the procedure.

This procedure is an example of two pixel skipping procedures being combined. According to the first pixel skipping procedure, all the dots formed by the pixels one row inward from the contour line are skipped. The second pixel skipping procedure is identical to the one shown in FIG. 1a. Such skipping is particularly effective when a special type of print medium is used, such as in cases in which, for example, text is printed on plain paper with low ink absorption. This method will be described in detail below with reference to a second working example.

According to the present invention, bleeding along contour lines is controlled by establishing a specific rule for reducing the amount of ink for the dots in the contour lines disposed parallel to the direction of main scanning in a printing device for forming images by ejecting ink dots, with some components moving in the direction of main scanning. In the example shown in FIG. 1, the high-concentration regions constituting the characters correspond to image areas composed of pixel arrays for forming specific types of dots in accordance with the claims. The present invention is also applicable to cases in which contour lines are formed by disposing high-concentration regions of different colors adjacent to each other, such as when, for example, black characters are printed on a yellow background.

B. Device Structure

FIG. 2 is a block diagram depicting the structure of a print system configured according to a working example of the present invention. The print system comprises a computer 88 as a print control device, and a color printer 20 as a print unit. A combination of the color printer 20 and computer 88 can be broadly referred to as a printing device.

The computer 88 executes an application program 95 with the aid of a special operating system. The operating system has a video driver 94 or printer driver 96, and the print data PD to be forwarded to the color printer 20 are output by the application program 95 via these drivers. The application program 95 processes images in the desired manner and displays these images on a CRT 21 via the video driver 94.

When the application program 95 issues a print command, the printer driver 96 of the computer 88 receives video data from the application program 95, and the result is converted to the print data PD to be sent to the color printer 20. In the example shown in FIG. 2, the printer driver 96 comprises a resolution conversion module 97, a color conversion module 98, halftone module 99, a print data generator 100, a contour line extractor 101, an ink amount reducer 102, and a color conversion table LUT. In the present working example, the resolution conversion module 97, color conversion module 98, and halftone module 99 constitute the dot data generator referred to in the claims.

The role of the resolution conversion module 97 is to convert the resolution (that is, the number of pixels per unit length) of the color video data handled by the application program 95 to a resolution that can be handled by the printer driver 96. The video data whose resolution has been converted in this manner constitute video information, which is composed of the three colors RGB. The color conversion module 98 converts the RGB video data to multi-tone data to obtain a plurality of ink colors suitable the color printer 20. The conversion is performed for each pixel while the color conversion table LUT is referenced.

The color-converted multi-tone data may, for example, have 256 gray scale values. The halftone module 99 performs a halftone procedure designed to represent these gray scale values with the aid of the color printer 20 by forming dispersed ink dots. The halftone data generated as a result of the halftone procedure are queued in the order of the data to be forwarded to the color printer 20 by the print data generator 100, and are output as final print data PD. The print data PD comprise raster data for specifying the manner in which dots are recorded during each main scan, and data for specifying the amount of feed in the direction of sub-scan. The functions performed by the contour line extractor 101 and ink amount reducer 102 will be described below. The print data generator 100 and the ink amount reducer 102 corresponds to a dot data adjuster in the claims.

The printer driver 96 is a program for executing the functions involved in generating print data PD. The programs for executing the functions of the printer driver 96 are supplied as products stored on computer-readable storage media. Examples of such storage media include floppy disks, CD-ROMs, magneto optical disks, IC cards, ROM cartridges, punch cards, printed matter containing bar codes and other symbols, computer internal storage devices (RAM, ROM, and other types of memory) and external storage devices, and various other types of computer-readable media.

Figure 3:
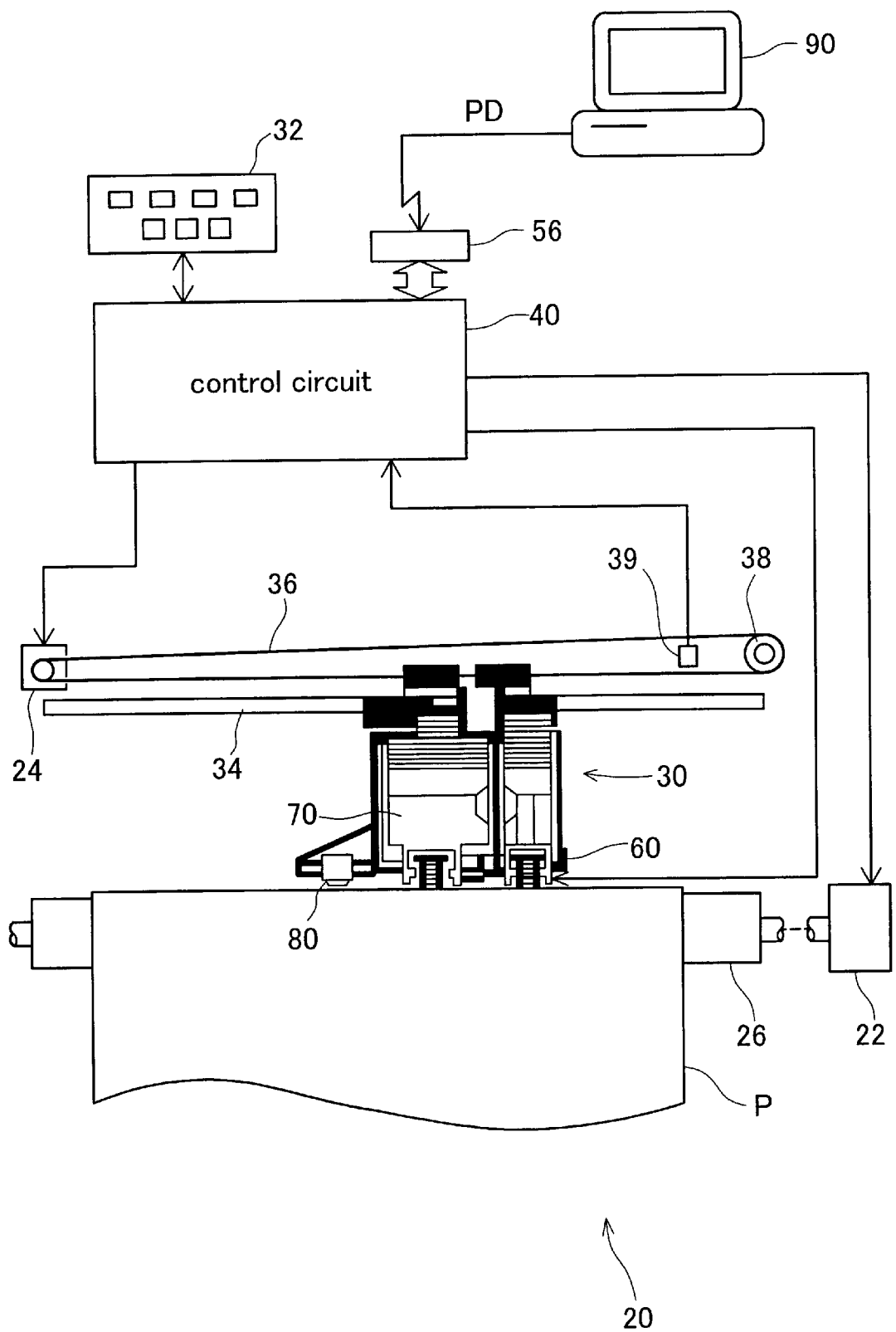
FIG. 3 is a diagram depicting the structure of a printer.

FIG. 3 is a schematic block diagram of the color printer 20. The color printer 20 comprises a secondary scan/feed mechanism for transporting printing paper P in the direction of sub-scan by means of a paper feed motor 22, a main scan/feed mechanism for reciprocating a carriage 30 in the axial direction (direction of main scanning) of a platen 26 by means of a carriage motor 24, a head drive mechanism for ejecting the ink and forming dots by actuating the print head unit 60 (print head assembly) mounted on the carriage 30, and a control circuit 40 for exchanging signals among the paper feed motor 22, the carriage motor 24, the print head unit 60, and a control panel 32. The control circuit 40 is connected by a connector 56 to the computer 88.

The secondary scan/feed mechanism for transporting the printing paper P comprises a gear train (not shown) for transmitting the rotation of the paper feed motor 22 to the platen 26 and a roller (not shown) for transporting the printing paper. The main scan/feed mechanism for reciprocating the carriage 30 comprises a sliding shaft 34 mounted parallel to the axis of the platen 26 and designed to slidably support the carriage 30, a pulley 38 for extending an endless drive belt 36 from the carriage motor 24, and a position sensor 39 for sensing the original position of the carriage 30.

Figure 4:
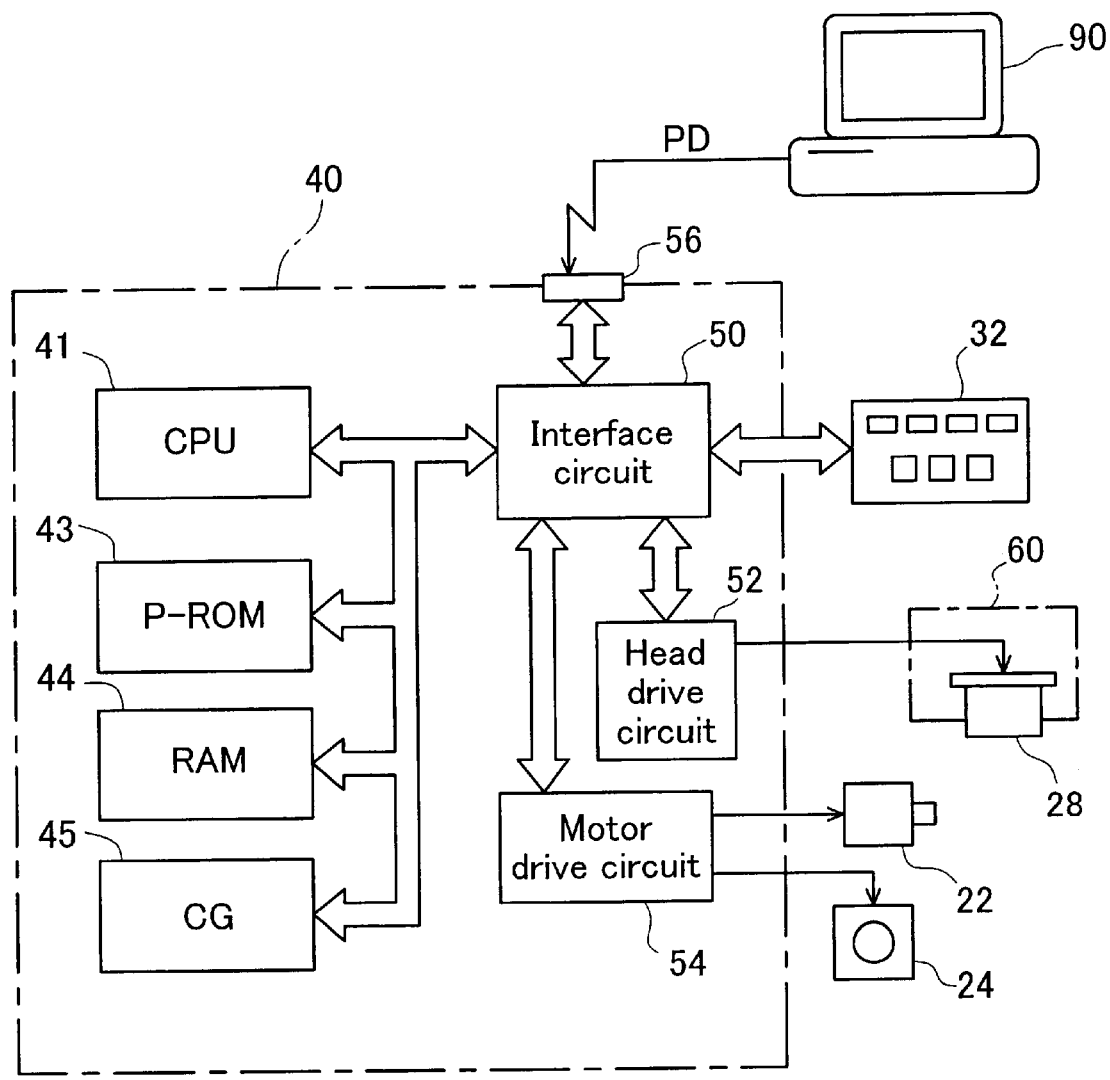
FIG. 4 is a block diagram depicting the structure of the control circuit 40 in a color printer 20.

FIG. 4 is a block diagram depicting the structure of a color printer 20 based on the control circuit 40. The control circuit 40 is composed as an arithmetic Boolean circuit comprising a CPU 41, a programmable ROM (PROM) 43, a RAM 44, and a character generator (CG) 45 containing dot matrices for characters. The control circuit 40 further comprises a dedicated I/F circuit 50 for creating a dedicated interface with external motors and the like, a head drive circuit 52 connected to the dedicated I/F circuit 50 and designed to eject ink by actuating the print head unit 60, and a motor drive circuit 54 for actuating the paper feed motor 22 and carriage motor 24. The dedicated I/F circuit 50 contains a parallel interface circuit and is capable of receiving print data PD from the computer 88 via the connector 56. The color printer 20 prints images in accordance with the print data PD. RAM 44 functions as a buffer memory for the temporary storage of raster data.

The print head unit 60 has a print head 28 and allows ink cartridges to be mounted. The print head unit 60 can be mounted on the color printer 20 and removed therefrom as a single component. In other words, the print head unit 60 is replaced when the print head 28 needs to be replaced.

C. First Working Example

Figure 5:
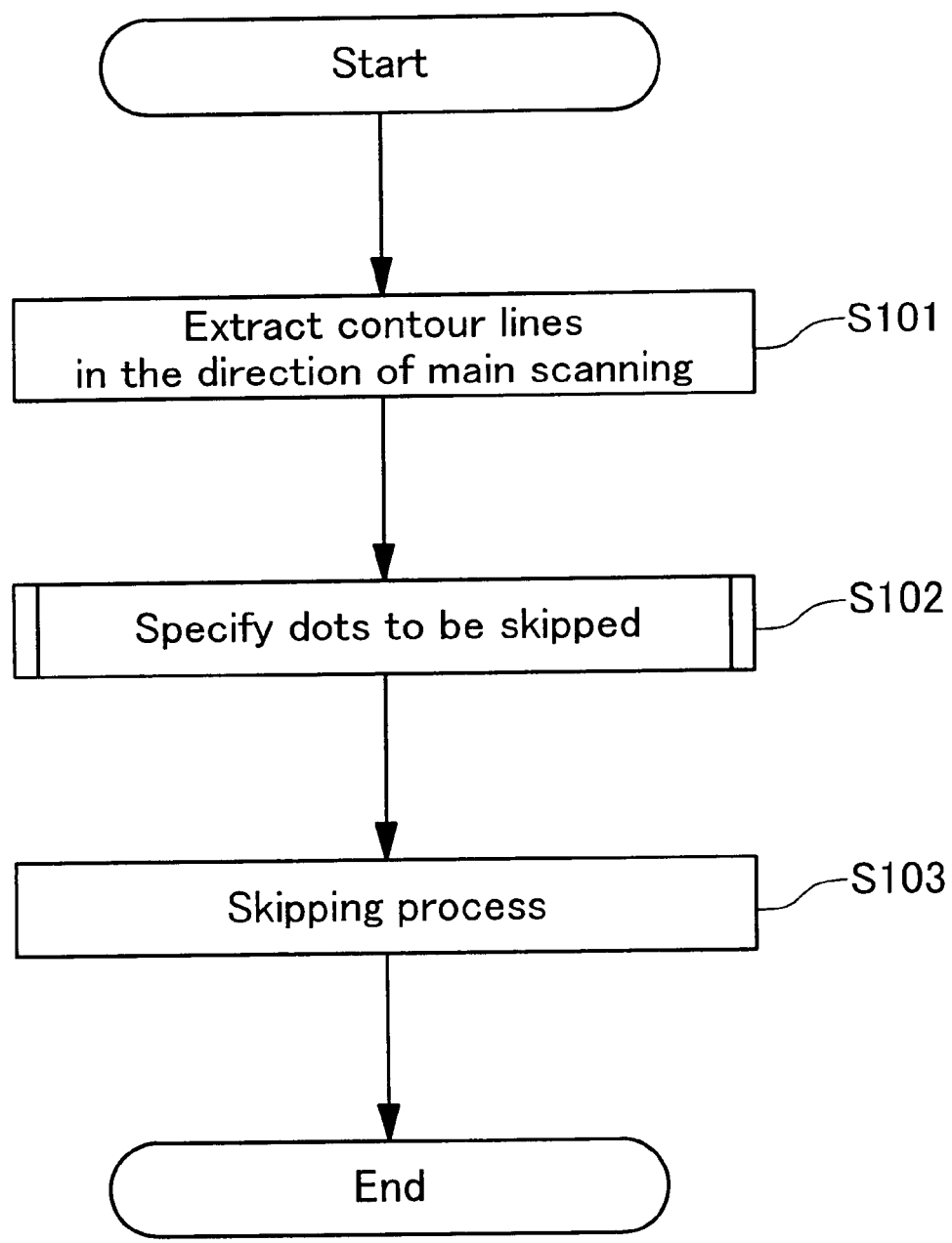
FIG. 5 is a flowchart of a dot skipping procedure performed in accordance with the first working example of the present invention.

FIG. 5 is a flowchart of a dot skipping procedure performed in accordance with the first working example of the present invention. According to the first working example, every second dot in the contour lines disposed parallel to the direction of main scanning is skipped, as shown in FIG. 1b. The amount of ink is thus reduced in a systematic manner in the direction of main scanning, and less ink is deposited along the contour lines.

Figures 6A, 6B, 6C:
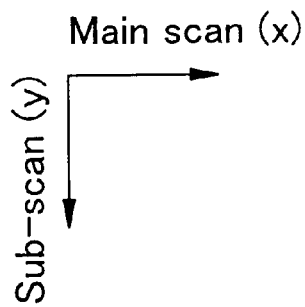
FIGS. 6(a)–6(c) depict the filters used to extract contour lines according to the first working example of the present invention.

In step S101, the contour line extractor 101 extracts the contour lines that are parallel to the direction of main scanning. In the present working example, a first derivation filter such as the one shown in FIG. 6a may be used as the simplest contour line extraction filter for such extraction. This filter has directionality in the direction of sub-scan and can extract contour lines that are parallel to the direction of main scanning. As used herein, the term "contour line" refers to an area of single pixel width that defines the outermost boundary of an image area composed of a pixel array for forming specific types of dots. Such a line is disposed adjacent to a discontinuity whose unique attributes (dot size or color) define this image area. The discontinuity may be a border between dot-forming pixels and dot-free pixels, as shown, for example, in FIG. 1a. Contour lines disposed parallel to the direction of main scanning will be referred to hereinbelow as "transverse contour lines," and those disposed parallel to the direction of sub-scan will be referred to as "longitudinal contour lines."

The contour line extraction filter can be any filter capable of extracting transverse contour lines. It can be a directional filter such as the one shown in FIG. 6b, or a nondirectional filter such as the one shown in FIG. 6c.

FIG. 7 is a diagram illustrating the ink rate reduction procedure. FIG. 7a depicts the dot pattern existing prior to the ink rate reduction procedure. In this example, a single type of dot size is involved, and the halftone data can assume only two values: "0" (dot absent) and "1" (dot present). The empty columns in the drawings depict cases of zero data. Applying the above-described first derivation filter to this dot pattern yields results such as those shown in FIG. 7b. These filtering results indicate that although the contour lines on the upper side of an image are extracted unchanged, the contour lines on the lower side of the image appear as contour lines of opposite sign at pixel positions disposed one pixel lower. Contour lines such as the one shown in FIG. 7c can be obtained by reversing the sign of the contour lines on the lower side of the image and moving them one pixel higher.

In step S102, the ink amount reducer 102 specifies the dots to be skipped. The number of skipped dots may, for example, be equal to about half the dots in a contour line, in which case even-numbered dots are skipped in the direction of main scanning. As a result, the amount of ink supplied to form a contour line can be reduced in half, and the dots extended in the direction of main scanning can be joined together, making it possible to minimize ink accumulation.

Figure 8:
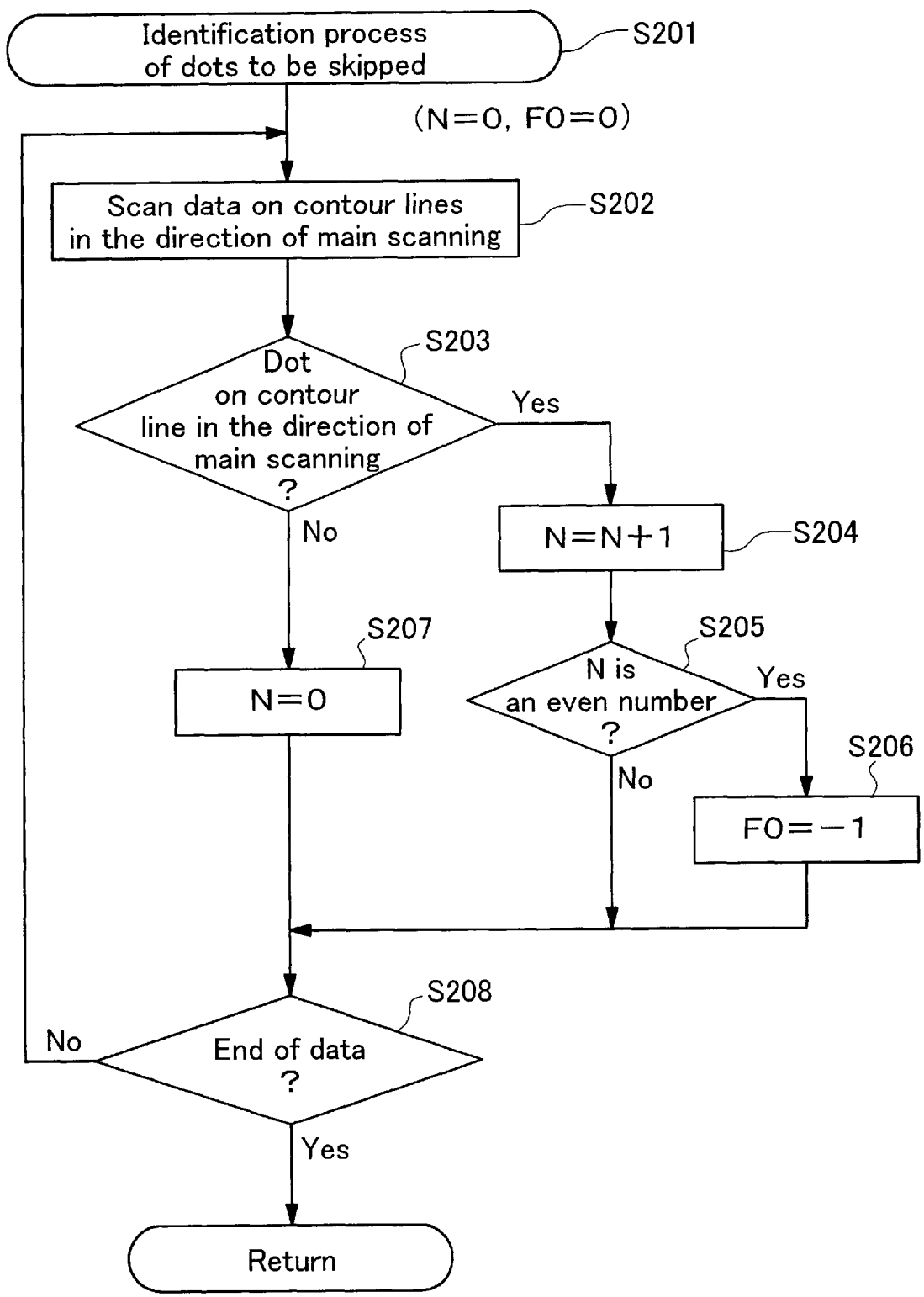
FIG. 8 is a flowchart depicting the exact order in which the dots to be skipped are processed in a specific manner during step S102.

FIG. 8 is a flowchart depicting the exact order in which the dots to be skipped are processed in a specific manner during step S102. In step S201, default setting are selected by the ink amount reducer 102. Selecting the default settings in this manner includes performing an operation in which the flags F0 for specifying the dots to be skipped are set to zero for each pixel. In step S202, the ink amount reducer 102 operates configured to the data processed in step S101 are scanned in the direction of main scanning for each scan line. In step S203, the ink amount reducer 102 determines whether a dot is on a contour line in the direction of main scanning. The processing result obtained in step S101 can be used to determine the outcome on the basis of the corresponding pixel value. In the example under consideration, it can be concluded that a dot is on the contour line if the pixel value is 1. The operation proceeds to step S204 if it is determined that the dot is on the contour line, and to step S207 if it is determined that the dot is outside the contour line.

In step S204, the ink amount reducer 102 counts the dots on the contour line. In step S205, the ink amount reducer 102 selects a setting for the flag F0 on the basis of the count. Specifically, "−1" is selected for the flag F0 of a pixel, indicating that the dot is to be skipped, if an even count N is obtained (step S2606). Conversely, the default setting of 0 is retained for the flag F0 if an odd count N is obtained.

In step S203, the count N is reset to zero if the ink amount reducer 102 has determined that the dot lies outside the contour line in the direction of main scanning. A flag F0 such as the one shown in FIG. 7d can be obtained as a result of such processing. Such flags F0 represent data for specifying the dots to be skipped. Obtaining this processing result concludes the procedure for specifying the dots to be skipped (step S102 in FIG. 5).

In step S103, the ink amount reducer 102 skips some dots. The procedure is performed by a method in which the values of pixels specified by the flag F0 in FIG. 7d are changed from the unprocessed dot pattern shown in FIG. 7a. In this example, the dots are skipped by a method in which the values of pixels with a flag F0 of −1 are changed from "1" to "0" in the unprocessed dot pattern shown in FIG. 7a. A sparser dot pattern (FIG. 7e) is thus obtained.

Such skipping can regularly reduce the amount of ink supplied to form the dots for the contour lines disposed parallel to the direction of main scanning, which is the direction in which the ink tends to accumulate. Bleeding from the contour line can be reduced as a result. Although the above example was described with reference to a case in which the amount of ink was regularly reduced by the skipping of even-numbered dots, the concept of "systematic" is not limited to this method alone. It is possible, for example, to adopt a method in which one out of every three dots is skipped.

The amount of ink supplied to form a contour line is not necessarily reduced by skipping some dots. For example, the amount of ink can be reduced by reducing dot size. Alternatively, the method in which the amount of ink is reduced in a systematic manner can be limited to cases in which large dots are formed.

In the above example, the amount of ink was reduced by deleting even-numbered dots from a continuous series of dots extending in the direction of main scanning in step S205. Even with even numbers, however, it is inadvisable to skip any dots in a contour line disposed in the direction of sub-scan. As shown, for example, in FIG. 7f, a contour line is formed in the direction of sub-scan by column I in the absence of dots in column J. It is inadvisable to skip dots in such cases. This type of procedure may, for example, be carried out in step S206 with regard to the pixel values disposed next to each other in the direction of main scanning.

D. Second Working Example

Figure 9:
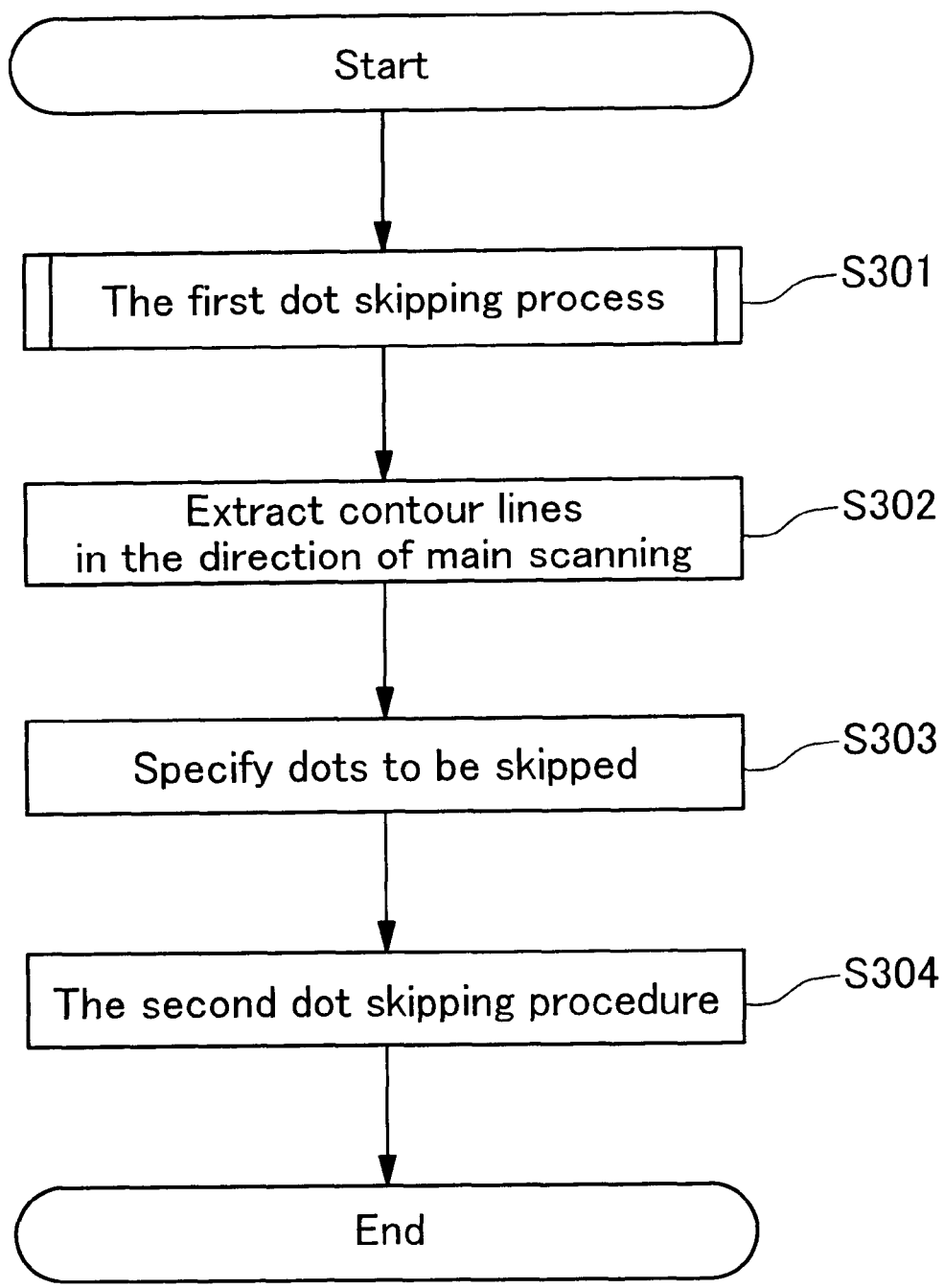
FIG. 9 is a flowchart of a dot skipping procedure performed in accordance with a second working example of the present invention.

FIG. 9 is a flowchart of a dot skipping procedure performed in accordance with the second working example of the present invention. In the second working example, two skipping procedures are performed. In the first skipping procedure, the amount of ink is reduced for the dots designed to form pixels one row inward from a contour line, rather than on the contour line itself. It is thus possible, for example, to print high-concentration images with sharply defined outlines on plain paper with low ink absorption. The second skipping procedure involves deleting dots from a contour line and is the same procedure as the one described with reference to the first working example.

The ink amount reducer 102 performs the first skipping procedure in step S301. Such skipping is carried out in order to regularly reduce the supply of ink to the dots for forming pixels one row inward from the contour line, as described above.

FIG. 10 is a diagram illustrating the manner in which the amount of ink is reduced according to the second working example of the present invention. The drawing depicts the halftone data representing a single main scan line. The data existing prior to a skipping procedure are shown in FIG. 10a. According to these data, "1" indicates the presence of a dot; "0," the absence of a dot. FIG. 10b depicts results obtained by extracting a longitudinal contour line by a method based on the technique described with reference to the first working example. FIGS. 10c and 10d depict flags F1 and F2, which are used to determine the need for forming dots for particular pixels. The method for setting up the flags F1 and F2 will be described below. FIG. 10e shows a logical product of flags F1 and F2, which is used to obtain the data shown in FIG. 10f. The data shown in FIG. 10f represent the dot pattern resulting from the first skipping procedure. The above-described procedure is carried out in the following sequence.

Figure 11:
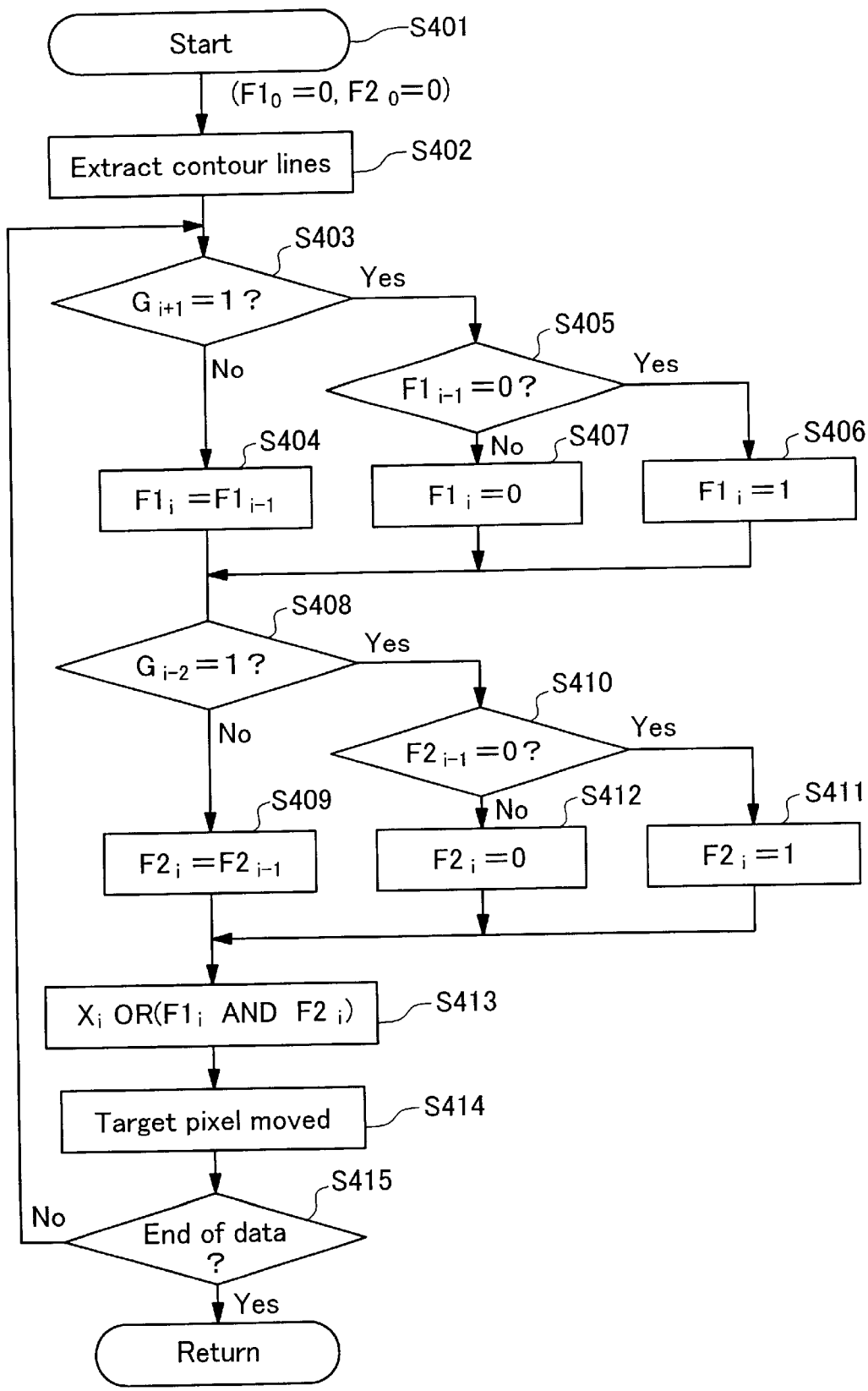
FIG. 11 is a flowchart of a first dot skipping procedure performed in accordance with the second working example of the present invention.

FIG. 11 is a flowchart of a first dot skipping procedure performed in accordance with the second working example of the present invention. In step S401, default settings are selected by the ink amount reducer 102. Selecting default settings in this manner includes selecting "0" as the initial state of the flags F1 and F2 for determining whether a target pixel is to be recorded. In step S402, the contour line extractor 101 extracts a contour line from halftone data. Unlike in the first working example, this contour line also contains a longitudinal contour line. An oblique contour line may also be extracted in this case.

In step S403, the ink amount reducer 102 uses data generated by the aforementioned contour line extraction procedure (FIG. 10b) to determine the type of setting for the flag F1$i$ of an i-th target pixel Gi on the basis of a pixel value Gi+1, which is disposed one pixel to the right from the target pixel Gi. If the pixel value Gi+1 is zero, the flag F1$i$ is set to the same value as the flag F1$i$−1 of the immediately preceding target pixel, and the operation is proceeds to step S408 (step S404). Consequently, the same value (zero) is selected for the flag F11 of pixel 1 as for the flag F10 in the initial state (FIG. 10c).

The following procedure is performed (step S405) if the pixel value Gi+1 is equal to 1. The flag F1$i$ is set to 1 if the flag F1$i$−1 is equal to zero (step S406). The flag F1$i$ is set to zero if the flag F1$i$−1 is equal to 1 (steps S405 and S407). Consequently, the flag F12 of pixel 2 is equal to 1, and the flag F19 of pixel 9 is equal to zero (FIG. 10c). Once the flag F1 is set, the operation proceeds to step S408. Flag F1 is thus created.

In step S408, the ink amount reducer 102 uses data generated by the contour line extraction procedure (FIG. 10b) to determine the type of setting for the flag F2$i$ of a target pixel Gi on the basis of a pixel value Gi−2, which is disposed two pixels to the left from the target pixel Gi. If the pixel value Gi−2 is zero, the flag F2$i$ is set to the same value as the flag F2$i$−1 of immediately preceding target pixel, and the operation proceeds to step S413 (step S409). Consequently, the same value (zero) is selected for the flags F21–F24 of pixels 1–4 as for the flag F20 in the initial state (FIG. 10d).

The following procedure is performed (step S410) if the pixel value Gi−2 is equal to 1. The flag F2$i$ is set to 1 if the flag F2$i$−1 is equal to zero (step S411). The flag F2$i$ is set to zero if the flag F2$i$−1 is equal to 1 (step S412). Consequently, the flag F15 of pixel 5 is equal to 1, and the flag F112 of pixel 12 is equal to zero (FIG. 10d). Once the flag F2 is set, the operation proceeds to step S413. Flag F2 is thus created.

In step S413, the ink amount reducer 102 performs specific calculations and generates a sparser pattern. These calculations are performed using extracted contour line data X (FIG. 10b) in conjunction with flags F1 and F2. The above-described procedure is shifted one target pixel at a time (step S414) to cover the entire data (step S415).

Dots adjacent to the contour line can this be skipped, as shown in FIG. 10f. Specifically, pixels 3 and 10 constitute a longitudinal contour line in FIG. 10f while pixels 4 and 9, which are adjacent thereto and disposed inwardly therefrom, are skipped. This procedure is different from the skipping procedure of the first working example and involves both the direction of main scanning and the direction of sub-scan. This procedure may also be performed in an oblique direction.

Figures 12A, 12B, 12C, 12D, 12E:
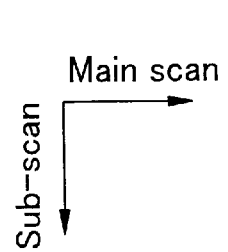
FIGS. 12(a)–12(e) are diagrams depicting the manner in which first and second ink rate reduction procedures are performed in accordance with the second working example of the present invention.

FIG. 12 is a diagram depicting the manner in which first and second ink rate reduction procedures are performed in accordance with the second working example of the present invention. FIG. 12a depicts a dot pattern existing prior to the skipping procedure. FIG. 12b depicts data obtained by extracting a contour line during step S402 in FIG. 11. These data correspond to the data shown in FIG. 10b. It can be seen in the drawings that contour lines are extracted both in the direction of main scanning and in the direction of sub-scan. FIG. 12c depicts the dot pattern obtained following the first skipping procedure, which is the procedure shown in FIG. 11. The resulting data correspond to the data shown in FIG. 10b. In this procedure, some of the pixel dots on the inside of transverse and longitudinal contour lines are skipped. Once the first skipping procedure is completed, the operation proceeds to step S 302 (FIG. 9).

In steps S302 and S303, the ink amount reducer 102 performs the same procedure as in the first working example, generating flag data such as those shown in FIG. 12d. The flag data shown in FIG. 12d are the same as in FIG. 7d. The sparser dot pattern of the second working example can be obtained in the manner shown in FIG. 12d (S304) by adding together these flag data and the dot pattern obtained by the first skipping procedure in FIG. 12b.

FIG. 13 is a diagram showing the dot pattern obtained after the amount of ink has been reduced by another skipping method. In FIG. 13a, only the dots adjacent to the inside of the transverse contour line are skipped, while no skipping is applied to the dots adjacent to the inside of the transverse contour line. In FIG. 13b, only half of the dots adjacent to the inside of the transverse contour line are skipped. In FIG. 13c, the dots on a transverse contour line and the dots inside the line are arranged in a staggered fashion by skipping only half of the dots adjacent to the inside of the transverse contour line.

The present working example also allows dots that are larger than a specific size to be skipped alone in the case of a printer 20 capable of forming dots of different sizes. Dot skipping may also be replaced by varying the dot size.

Figure 14A:
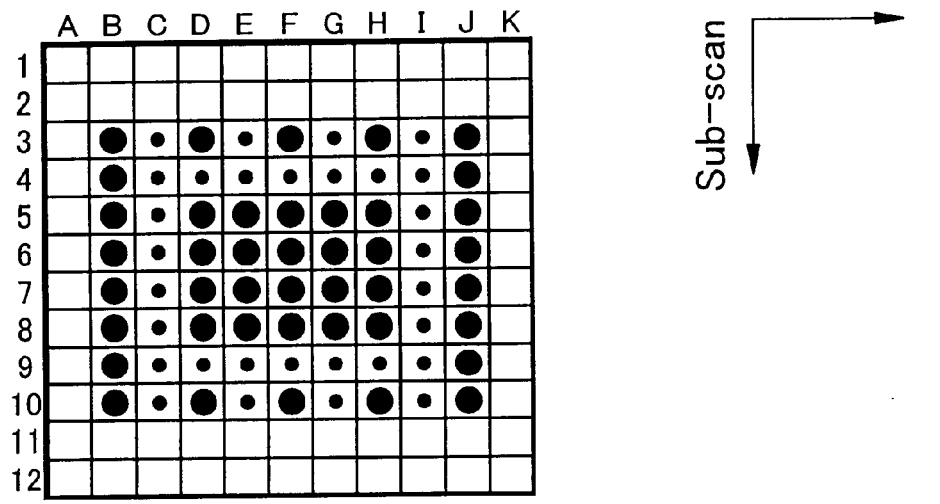
FIGS. 14(a) and 14(b) are diagrams depicting the dot pattern obtained after the amount of ink has been reduced by varying the dot size.
Figure 14B:
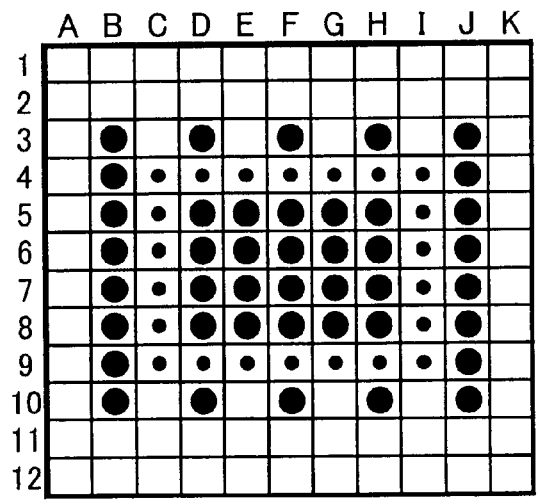

FIG. 14 is a diagram depicting the dot pattern obtained after the amount of ink has been reduced by varying the dot size. If FIG. 14a, small dots are formed at positions in which large dots have been skipped in accordance with the second working example. In FIG. 14b, small dots are formed at positions in which large dots have been deleted from the area inside a contour line, without the formation of small dots at positions in which large dots have been deleted from a transverse contour line. The amount of ink can thus be reduced by selectively skipping some dots or forming smaller dots in accordance with dot positions inside an image area (line-drawing area).

Bleeding from contour lines should preferably be reduced in a more detailed manner by reducing the dot size or adopting a method whereby dots adjacent to the contour lines are skipped as described above. The methods described with reference to the second working example are particularly effective when an attempt is made to print high-concentration images with clearly defined outlines on plane paper with low ink absorption.

E. Third Working Example

The third working example differs from the above-described working examples in that the skipping procedure is varied in accordance with the print mode. The following print mode parameters are used to determine the specifics of the skipping procedure adopted in the present working example.

(1) Print resolution
(2) Ink color (selected from "all-black" and "color")
(3) Type of print medium FIG. 15 is a diagram depicting an example of skipping performed when print resolution is higher in the direction of main scanning than in the direction of sub-scan. The drawing depicts, in enlarged form, some of the ink dots that form the letter "B" as a printed image. The drawing illustrates the manner in which some pixels are skipped when the print resolution is 720 dpi in the direction of main scanning, and 360 dpi in the direction of sub-scan. The left side of the drawing depicts the condition existing prior to the skipping procedure, and the right side of the drawing depicts the dot pattern obtained following the skipping procedure. It can be seen in the drawing that it is the dots constituting the contour lines (transverse contour lines) in the direction of main scanning that are skipped.

The following is the reason for skipping some of the pixels in a contour line disposed parallel to the direction of main scanning. A solid image is formed by completely filling pixels with ink dots. When, however, the pixels are larger in the direction of main scanning than in the direction of sub-scan in the manner shown in the drawing, the ink ultimately extends far outside the pixels in the direction of main scanning. In the particular case of a printing process in which ink droplets are ejected while the print head moves in the direction of main scanning, the dots arranged in the direction of main scanning form a continuous arrangement, so the ink for forming transverse contour lines tends to accumulate and bleed. Another feature of the process in which ink droplets are ejected while the print head moves in the direction of main scanning is that because the ink droplets acquire a certain speed in the direction of main scanning in the above-described manner, the process tends to yield dots that are longer in the direction of main scanning than in the direction of sub-scan. These results indicate that it is commonly preferable to skip some of the ink dots that make up a transverse contour line when print resolution is higher in the direction of main scanning than in the direction of sub-scan.

Figure 16A:
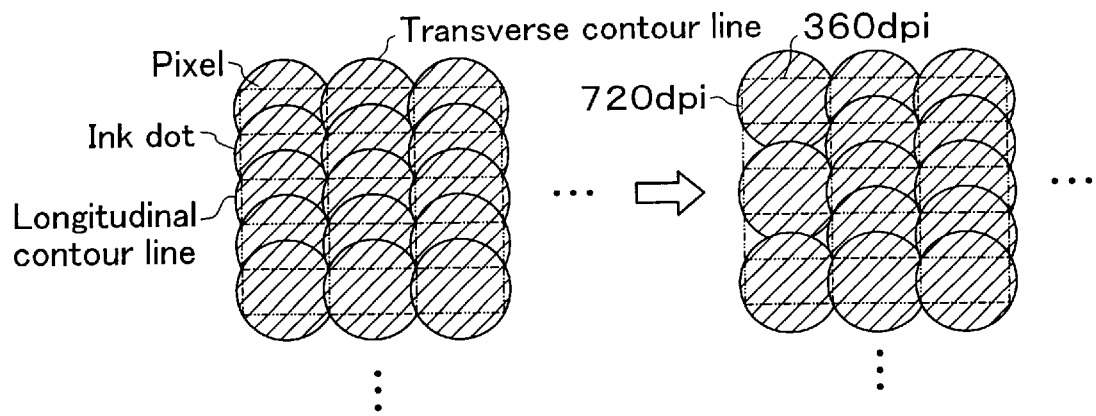
FIGS. 16(a) and 16(b) are diagrams depicting an example of skipping performed when printing is carried out using a high-density nozzle array configured to print resolution is higher in the direction of sub-scan than in the direction of main scanning.

FIG. 16 is a diagram depicting an example of skipping performed when printing is carried out using a high-density nozzle array configured to print resolution is higher in the direction of sub-scan than in the direction of main scanning. As used herein, the term "high-density nozzle array" refers to a row of nozzles spaced at less than $1/300^{th}$ of an inch, as in the present working example. FIG. 16a is similar to FIG. 15 in that it is a diagram depicting in enlarged form some of the ink dots that make up a printed image in the form of a character. The drawing illustrates the manner in which some pixels are skipped when the print resolution is 360 dpi in the direction of main scanning, and 720 dpi in the direction of sub-scan. The left side of the drawing depicts the condition existing prior to the skipping procedure, and the right side of the drawing depicts the dot pattern obtained following the skipping procedure. It can be seen in the drawing that it is the dots constituting the contour lines in the direction of sub-scan that are skipped. The only difference between this example and the example shown in FIG. 15 is that the skipping procedure is performed only when printing is carried out using a high-density nozzle array.

Figure 16B:
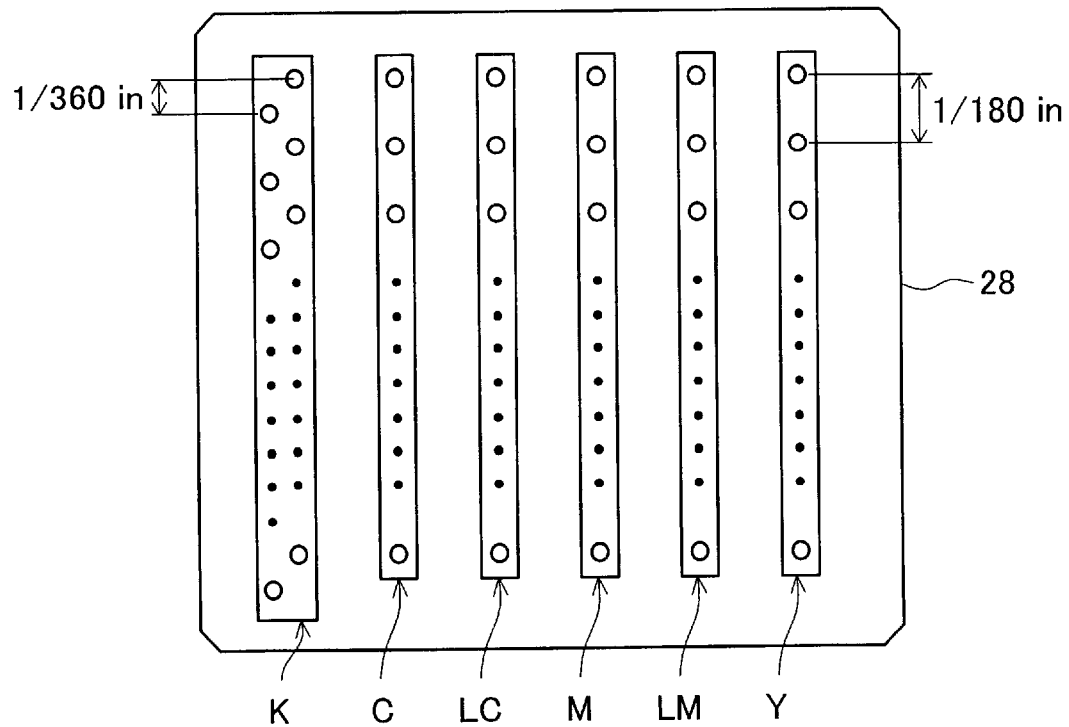

FIG. 16b is a diagram depicting a print head 28 containing a high-density nozzle array. The print head 28 comprises a black ink nozzle array K, a dark cyan ink nozzle array C, a light cyan ink nozzle array, a dark magenta ink nozzle array, a light magenta ink nozzle array, and a yellow ink nozzle array. The black ink nozzle array K is a high-density nozzle array because it has a nozzle pitch of $1/360^{th}$ of an inch. The other nozzle arrays are not high-density nozzle arrays because their nozzle pitch is $1/180^{th}$ of an inch. The reason that the black ink nozzle array K is considered to be a high-density nozzle array is that the number of nozzles is increased by a factor of 2 to allow black text or line drawings to be printed at a high speed.

Figure 17:
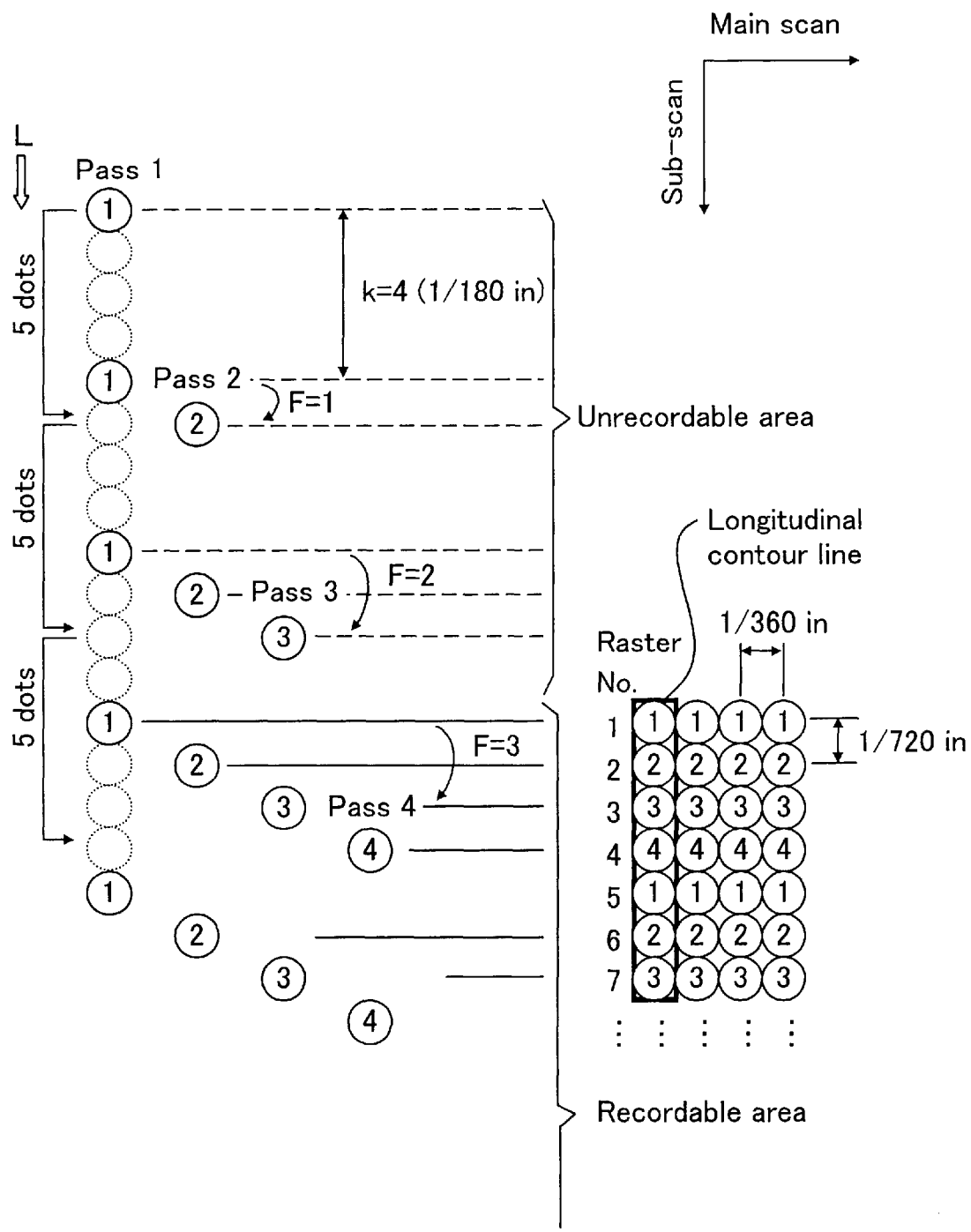
FIG. 17 is a diagram depicting the manner in which dots are formed using a regular nozzle array with a nozzle pitch of $1/180^{th}$ of an inch.

The following is the reason that skipping is performed only when printing is carried out using a high-density nozzle array. FIG. 17 is a diagram depicting the manner in which dots are formed using a regular nozzle array with a nozzle pitch of $1/180^{th}$ of an inch. As shown in the drawing, the dots are formed at a pitch of $1/720^{th}$ of an inch (720 dpi) in the direction of sub-scan with the aid of a nozzle array whose nozzle pitch is $1/180^{th}$ of an inch. When a transverse contour line is considered herein, it can be seen that dots belonging to a first raster are formed in the course of a first pass (pass 1) in the direction of main scanning, dots belonging to a second raster are formed in the course of a second pass (pass 2), dots belonging to a third raster are formed in the course of a third pass (pass 3), and dots belonging to a fourth raster are formed in the course of a fourth pass (pass 4).

It can thus be seen that adjacent dots are formed in a single longitudinal direction by successive main scans when these dots are formed using an ordinary nozzle array. It is apparent that when, for example, the dots belonging to the second raster are formed, the dots belonging to the first raster are formed during the immediately preceding pass, but the dots belonging to the third raster are not yet formed. When the dots belonging to the fourth raster are formed, the dots belonging to the fifth raster have already been formed. The ink is thus less likely to accumulate because the dots have been formed in the course of the three preceding passes.

Figure 18:
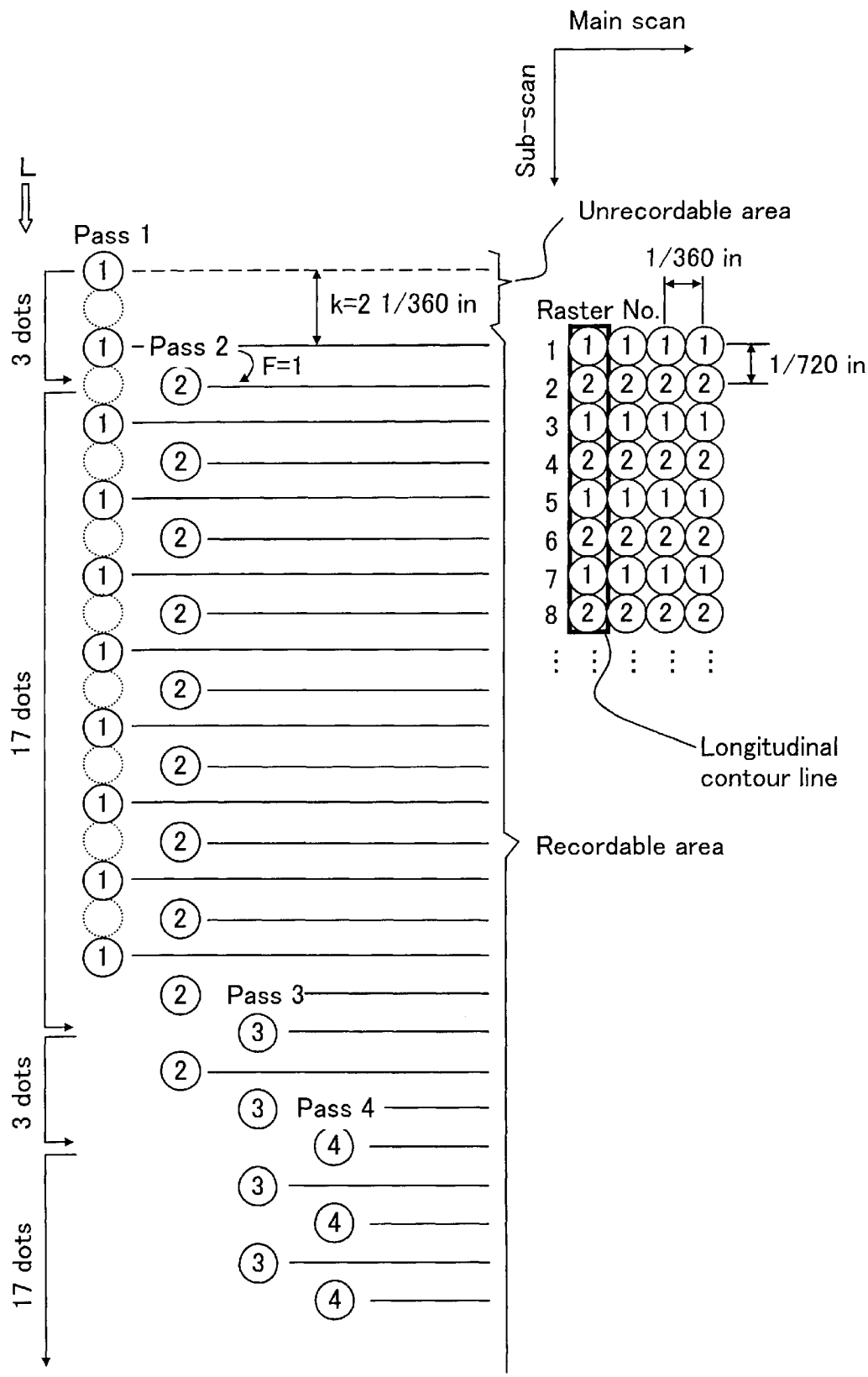
FIG. 18 is a diagram depicting the manner in which dots are formed using a high-density nozzle array with a nozzle pitch of $1/360^{th}$ of an inch.

FIG. 18 is a diagram depicting the manner in which dots are formed using a high-density nozzle array with a nozzle pitch of $1/360^{th}$ of an inch. As shown in the drawing, the dots are formed at a pitch of $1/720^{th}$ of an inch (720 dpi) in the direction of sub-scan with the aid of a nozzle array whose nozzle pitch is $1/360^{th}$ of an inch. When a longitudinal contour line is considered herein, it can be seen that dots belonging to first, third, and fifth rasters are formed in the course of a first pass (pass 1), and dots belonging to second and third rasters, which are interposed between the aforementioned odd-numbered rasters, are subsequently formed in the course of a second pass (pass 2).

It can thus be seen that dots adjacent to each other in the direction of sub-scan are formed by successive main scans when these dots are formed using a high-density nozzle array. It is apparent that the ink is more likely to accumulate than in the case shown in FIG. 17. This situation makes it more desirable to apply a skipping procedure to the dots for forming longitudinal contour lines when these dots are formed using a high-density nozzle array.

The ease with which ink accumulates varies with the print medium. For example, ink is less likely to accumulate when images are printed on a print medium with a high ink absorption rate (such as specialty paper), whereas ink accumulation tends to be facilitated when images are printed on a print medium with a low ink absorption rate (such as plain paper).

It can thus be seen that the specifics of a particular skipping procedure vary with print resolution, nozzle array density, and print medium type.

Figure 19:
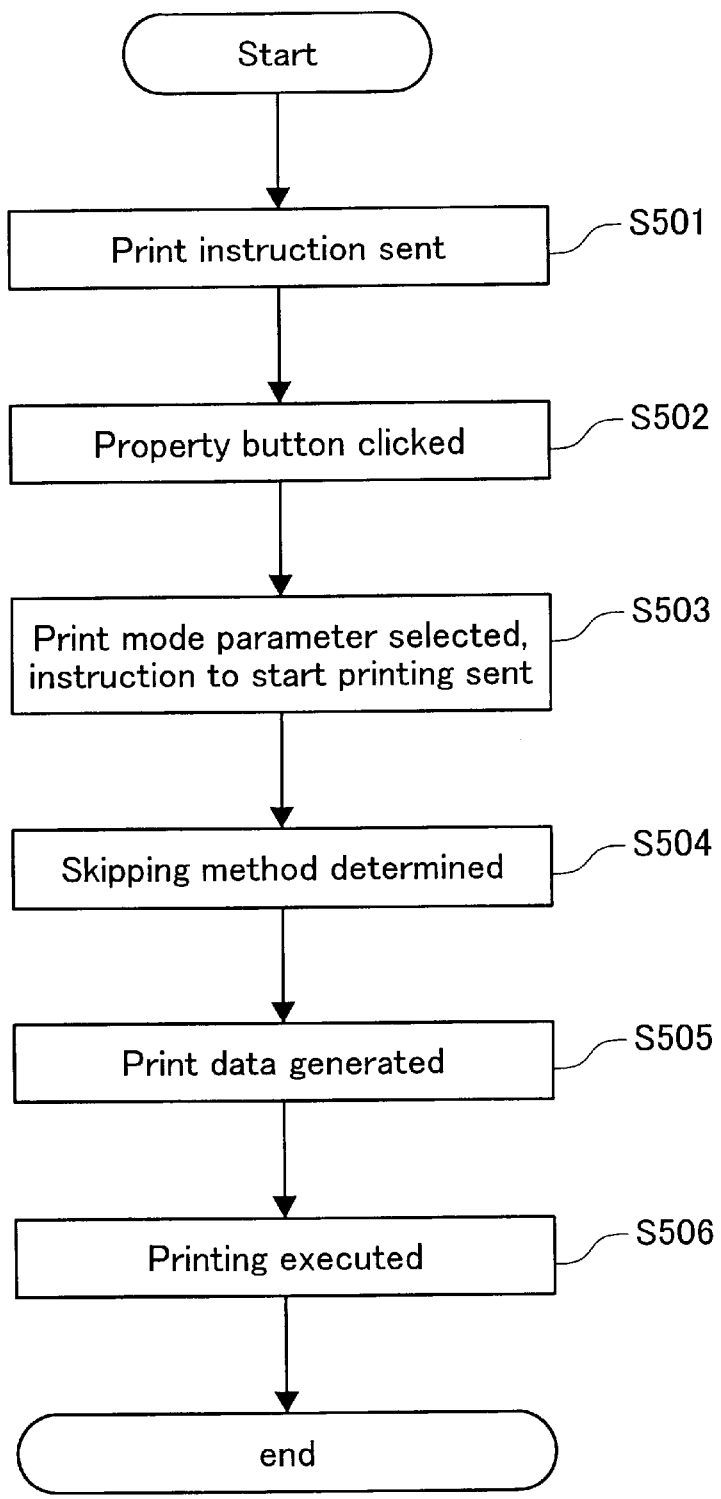
FIG. 19 is a flowchart depicting the printing and processing sequence adopted for a third working example of the present invention.
Figure 20:
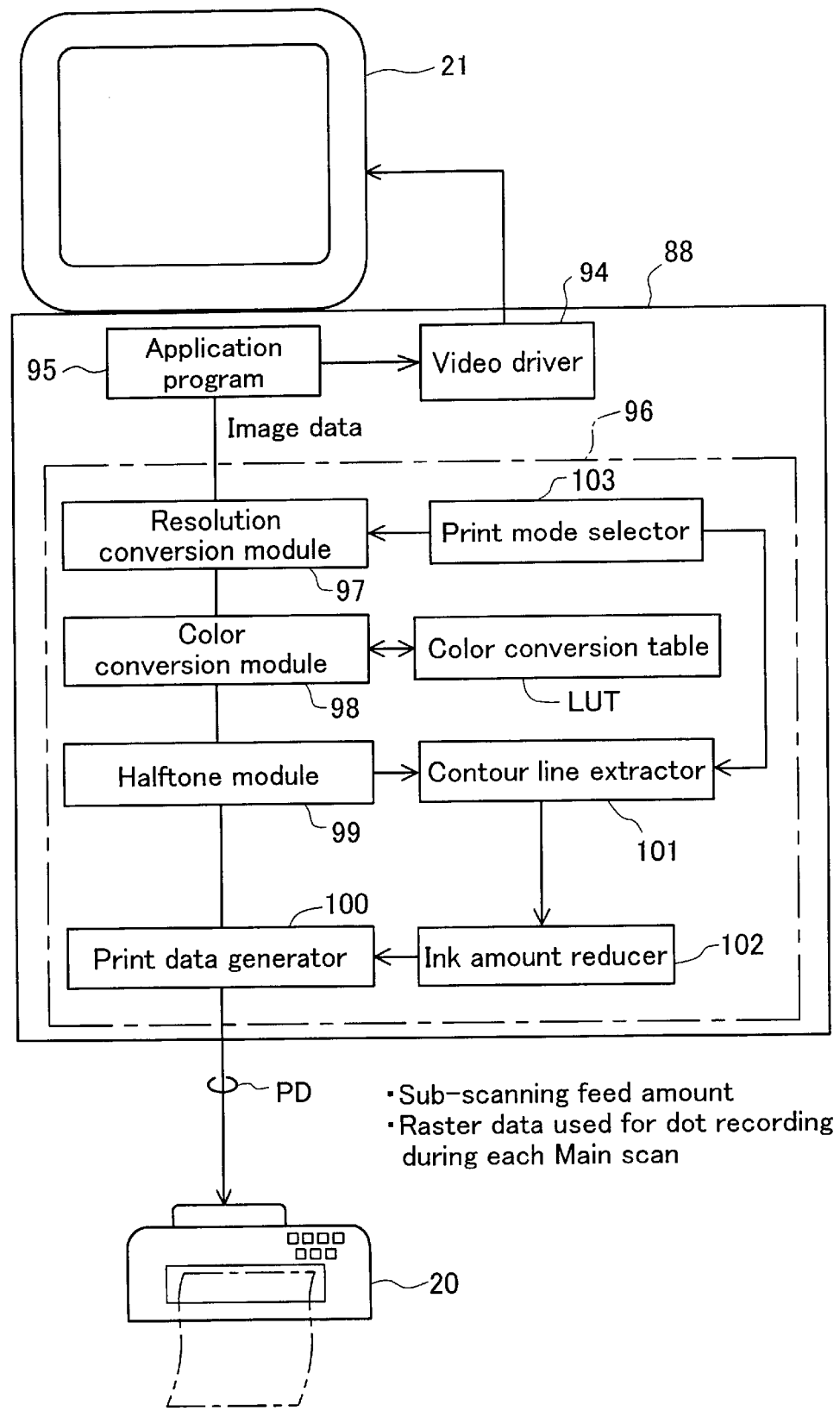
FIG. 20 is a block diagram depicting the structure of the print system adopted for the third working example of the present invention.
Figure 21:
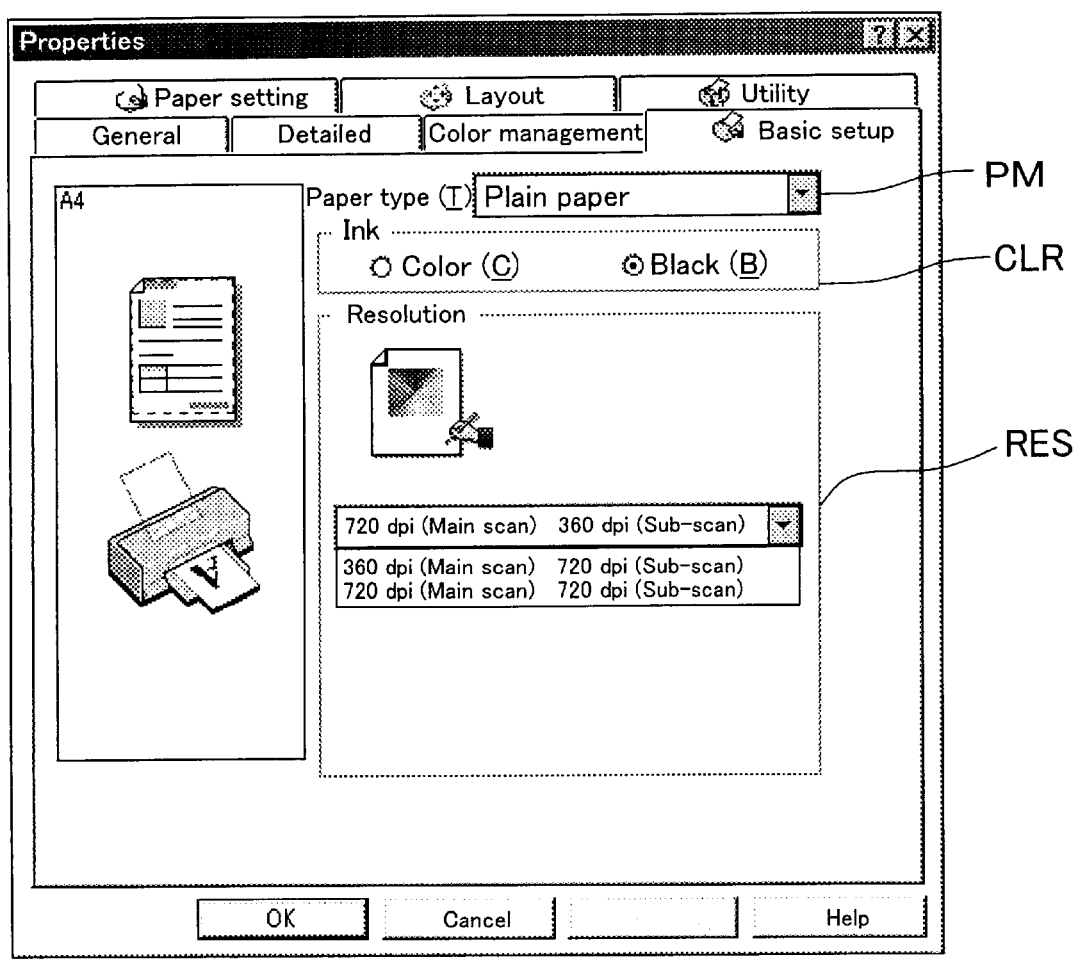
FIG. 21 is a diagram depicting an example of the basic setup screen for print modes displayed on a CRT 21.

FIG. 19 is a flowchart depicting the printing and processing sequence adopted for the third working example of the present invention. FIG. 20 is a block diagram depicting the structure of the print system adopted for the third working example of the present invention. FIG. 21 is a diagram depicting an example of the basic setup screen for print modes displayed on a CRT 21. The structure of the print system adopted for the third working example differs from the structure adopted for the first working example by the addition of a print mode selector 103.

The printing procedure allows the specifics of the skipping procedure to be varied depending on print mode parameters. In step S501, the user instructs the computer 88 to print. When a property button (not shown) inside the print dialog box on the CRT 21 is clicked in step S502, the print mode selector 103 (FIG. 20) causes the property setup screen shown in FIG. 21 to be displayed on the CRT 21.

The user can specify various parameters for selecting the print mode on the property setup screen. The basic setup screen for print modes in FIG. 21 contains the following elements for specifying these parameters.

(1) Paper type menu PM: A pull-down menu for selecting plain paper or specialty paper
(2) Ink color selection button CLR: A button for selecting the use of color inks or the use of a black ink
(3) Print resolution setting switch SW: A pull-down menu for selecting combinations of resolutions in the direction of main scanning and sub-scan.

The user can also select other parameters on a full setup screen for print modes, but these parameters will be omitted from the description that follows.

Once the user selects the various parameters for the print modes in step S503 in FIG. 19 and the printing is started, the printer driver 96 defines the specifics of the skipping procedure in step S504.

FIG. 22 is a diagram depicting the specifics of the skipping procedure defined in accordance with the print mode in step S504. In the present working example, the specifics of the skipping procedure are defined in accordance with print medium type, ink color, and print resolution, which are the parameters for specifying the print mode.

In the present working example, the print medium can be plain paper or specialty paper. In addition, there are only two options for the ink color: color and all-black. There are three options for the print resolution: 720 dpi×360 dpi (direction of main scanning×direction of sub-scan), 360 dpi×720 dpi (same as above), and 720 dpi×720 dpi (same as above). If specialty paper is used as the print medium, the skipping procedure is dispensed with irrespective of the type of other print mode parameters. The reason is that specialty paper can rapidly absorb ink, making a skipping procedure unnecessary. However, the specifics of the skipping procedure are defined in the following manner when plain paper is used as the print medium.

When dots adjacent to the inside of a contour line are involved, the skipping procedure is performed irrespective of other print mode parameters if the print medium is plain paper. This is the same skipping procedure as the one performed in accordance with the second working example above.

Figure 23A:
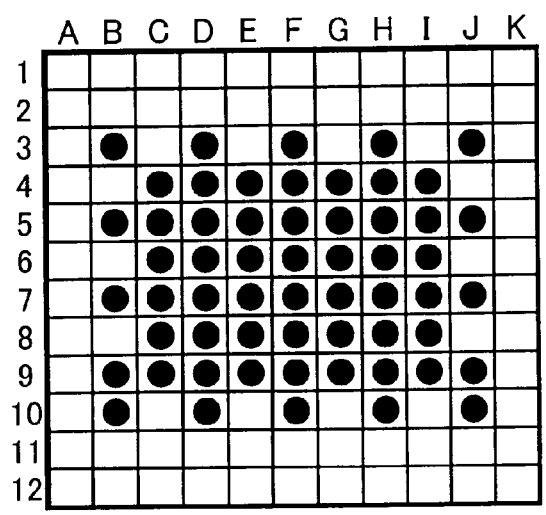
FIGS. 23(a) and 23(b) are diagrams depicting the dot pattern obtained after the amount of ink has been reduced both for a transverse contour line and a longitudinal contour line.
Figure 23B:
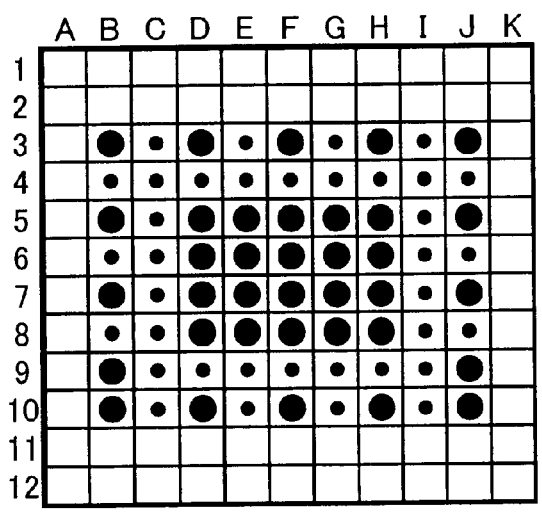

Transverse contour lines are subjected to a skipping procedure when the print medium is plain paper and the print resolution in the direction of main scanning is 720 dpi. The reason that the skipping procedure is performed for a print resolution of 720 dpi×720 dpi is that the printing device of the present working example is incapable of producing sufficiently small ink droplets required for filling in pixels with 720 dpi×720 dpi. A dot pattern such as the one shown in FIG. 23 may, for example, be formed in such a case. Some of the dots belonging both to transverse contour lines and to longitudinal contour lines should preferably be skipped because sufficiently small ink droplets needed to fill in pixels are commonly difficult to obtain with an ink-jet printing device at a resolution greater than 1200 dpi×1200 dpi.

A longitudinal contour line is subjected to a skipping procedure only when the print medium is plain paper, the print resolution in the direction of sub-scan is 720 dpi, and the ink is black. The reason that a skipping procedure is performed for a black ink is that the black ink nozzle array is the only high-density nozzle array provided to the print head 28. With a black ink, high-speed printing is performed using the black ink nozzle array alone.

Figure 24:
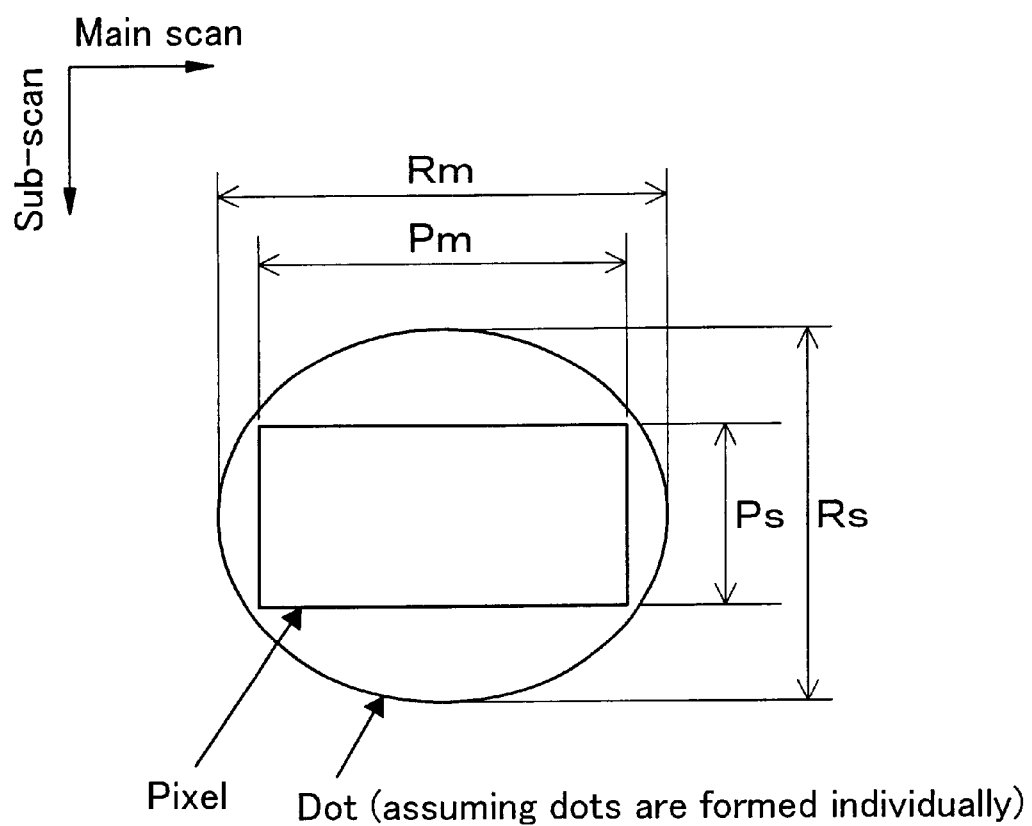
FIG. 24 is a diagram depicting the relation between print resolution and the skipping procedure.

FIG. 24 is a diagram depicting the relation between print resolution and the skipping procedure. The dot shown in the drawing is an ink dot obtained on the assumption that each dot is formed individually. The ink dot has dimension Rm in the direction of main scanning, and dimension Rs in the direction of sub-scan. The pixel shown in the drawing has dimension Pm in the direction of main scanning, and dimension Ps in the direction of sub-scan. The dimension Pm or Ps is the reciprocal of print resolution. For example, Pm is equal to $1/720^{th}$ of an inch when the print resolution is 720 dpi in the direction of main scanning.

According to the present working example, the decision to skip some dots is made based on whether the value obtained by dividing the length of the ink dot by the length of the pixel is greater than a specific predetermined threshold Thm or Ths. As used herein, Thm is the threshold in the direction of main scanning, and Ths is the threshold in the direction of sub-scan. For example, skipping is performed if Rm/Pm is greater than the threshold Thm in the direction of main scanning. The threshold Thm corresponds to the first threshold referred to in the claims, and the threshold Ths corresponds to the second threshold referred to in the claims.

Selecting a high threshold makes it less likely that spaces (voids) will form between dots but facilitates bleeding because of impaired skipping. Selecting a low threshold can further reduce bleeding but makes it more likely that voids will form. Setting the threshold Th to 2.0 allows skipping-induced voids to be removed substantially completely when images are printed on plain paper. Lowering the threshold Th to 1.8 is beneficial in the sense that the bleeding of contour lines can be further reduced while humanly perceivable voids are removed when images are printed on plain paper. It is assumed with regard to the printing device of the third working example that the same level is selected for the threshold Thm in the direction of main scanning as for the threshold Ths in the direction of sub-scan when images are printed on plain paper by a high-density nozzle array.

The specifics of the skipping procedure thus defined apply to an entire print job.

In step S505 of FIG. 19, the printer driver 96 generates print data that match the specifics of the skipping procedure selected for use in step S504. In step S506, the printer 20 prints images in accordance with the print data obtained from the computer 88.

In the third working example, the specifics of the skipping procedure performed during actual printing are thus defined in accordance with the following three print mode parameters: print medium type, ink color, and print resolution. The resulting advantage is that an optimum skipping procedure suitable for a given print mode can be performed.

As follows from the above description, the present invention entails adjusting dot data to achieve a systematic reduction in the amount of ink supplied to form a contour line, and an approach should preferably be adopted configured to the amount of ink supplied to form the dots adjacent to the inside of the contour line is reduced in a systematic manner depending on the print medium used or other printing conditions selected. A method in which the specifics of the skipping procedure are defined in accordance with the print mode in the above-described manner can be cited as an example of the technique for varying the specifics of the skipping procedure with the print medium used or other printing conditions selected.

F. Fourth Working Example

This working example is different from the above-described working examples in that the size of the dots in the pixels adjacent to the inside of a contour line are reduced without skipping some of the pixels in the contour line. Bleeding can thus be reduced without creating excessive voids.

Figure 25:
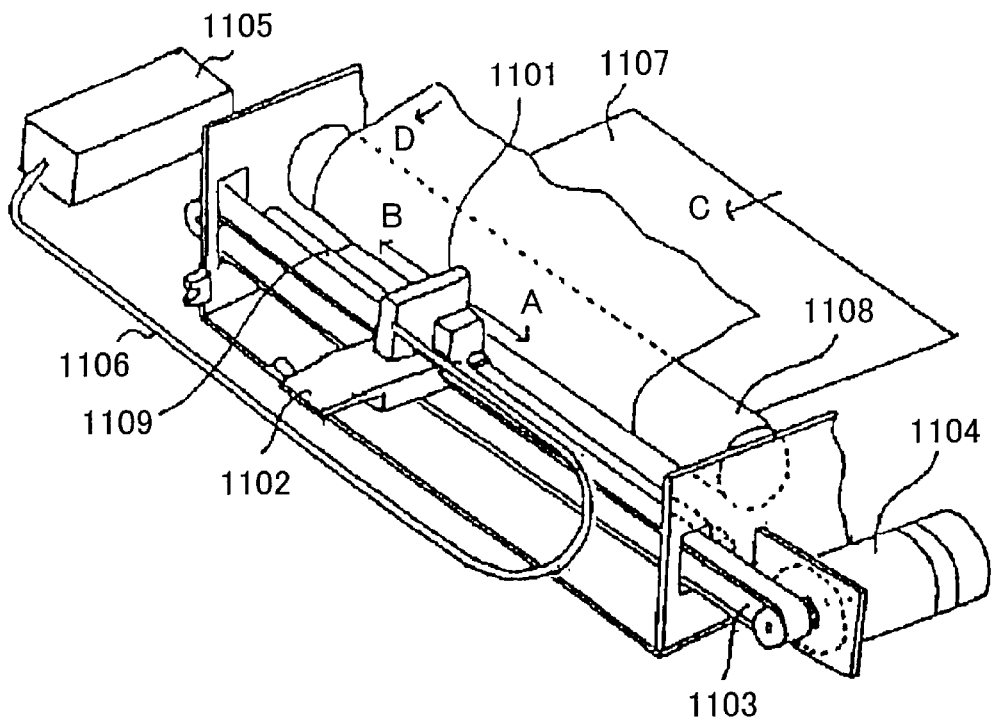
FIG. 25 is a diagram outlining the printer adopted for a fourth working example of the present invention.

FIG. 25 is a diagram outlining the printer adopted for the fourth working example of the present invention. A recording head 1101 (occasionally referred to as a "print head") is immovably mounted on a carriage 1102. The carriage 1102 can move in the course of main scanning along a guide shaft 1109 in the directions shown by arrows A and B. The main scanning is carried out by a carriage drive belt 1103, itself driven by a carriage drive motor 1104.

A recording medium 1107 (occasionally referred to as "print medium") is fed in the course of sub-scan in the direction of arrow C. The medium is fed in the direction of sub-scan by a conveyance roller 1108, itself driven by a conveyance roller drive motor (not shown). The dot-forming ink is fed to the recording head 1101 through an ink supply tube 1106 from an ink supply tank 1105.

The recording head 1101 ejects ink under the action of ejection drive elements. The recording head 1101 has 96 nozzles, arranged at a pitch of $\frac{1}{360}^{th}$ of an inch in the direction of sub-scan. As a result, the recording head 1101 can record at 360 dpi in a single main scan, and at 720 dpi in two main scans.

The ink used in the present working example comprises at least water, a pigment, and a resin emulsion. Specifically, the ink can be prepared by adding purified water to a mixture obtained by mixing the following components in an appropriate manner: 6 wt % of carbon black as a pigment, 3 wt % of a styrene/acrylic acid ester copolymer as a resin emulsion, and 15 wt % of diethylene glycol as a moisturizing agent, as well as 0.1 wt % of Proxel, 1.5 wt % of a surfactant, and other components.

The recording head 1101 deposits ink droplets on the recording medium 1107 by selectively ejecting these droplets from the nozzles in synchronism with the main scanning of the carriage 1102. When a main scan is completed, the recording medium 1107 is fed in the direction of sub-scan by the conveyance roller 1108. The desired printed image is formed on the recording medium by repeating such operations.

According to a specific example, the recording head 1101 can eject an ink droplet every time a distance of $\frac{1}{360}^{th}$ of an inch is traveled in the direction of main scanning when the print resolution is 360 dpi. Meanwhile, the recording medium 1107 is advanced $\frac{96}{360}^{th}$ of an inch in the direction of sub-scan every time a main scan is completed. The reason that the recording head 1101 is advanced $\frac{96}{360}$th of an inch in the direction of sub-scan is that the head has 96 nozzles and can form 96 main scan lines in a single main scan.

Figure 26:
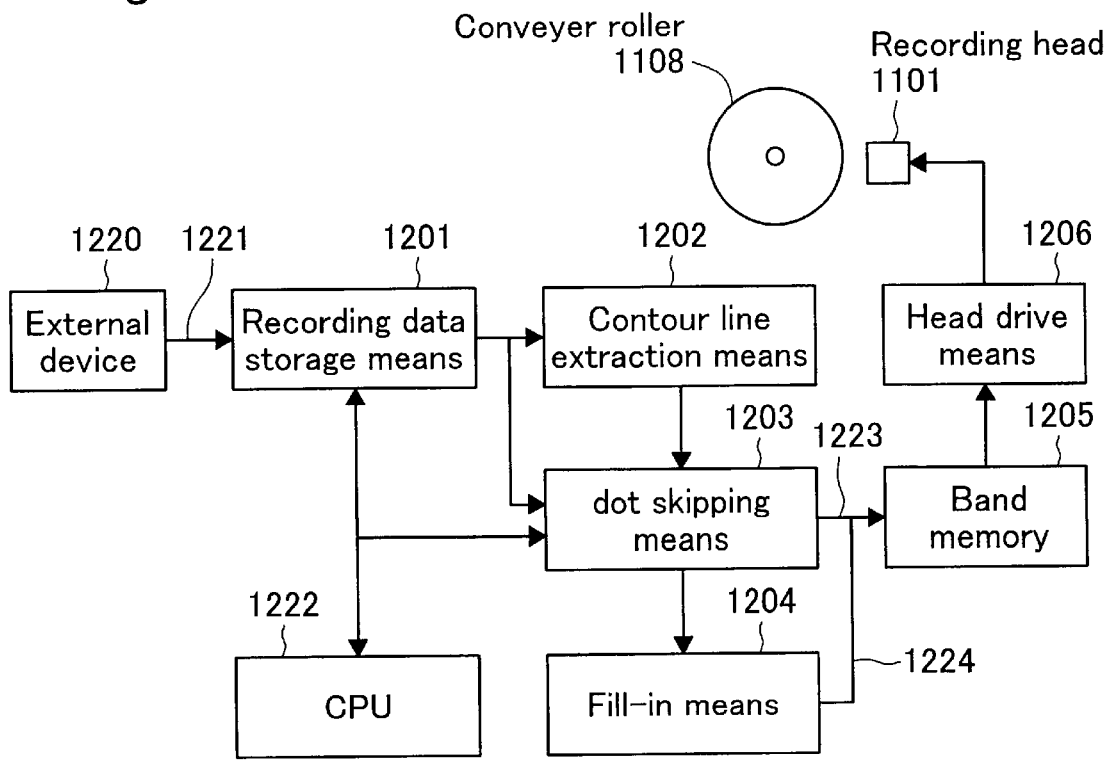
FIG. 26 is a block diagram outlining the printing device adopted for the fourth working example of the present invention.

FIG. 26 is a block diagram outlining the printing device adopted for the fourth working example of the present invention. The printing device pertaining to the present working example comprises an external device 1220 whereby dot data for expressing the dot formation geometry are obtained from print image data for expressing the image to be printed, a recording data storage means 1201 for recording the dot data 1221 forwarded by the external device 1220, a contour line extraction means 1202 for extracting the outline of the printed image from the dot data 1221, a skipping means 1203 for skipping some of the dots in the pixels adjacent to the inside of the extracted contour line, fill-in means 1204 for filling in the pixels targeted for skipping, a band memory 1205 for storing the dot data 1223 deleted by the skipping means 1203 and the fill-in data 1224 produced by the fill-in means 1204, and a head drive means 1206 for generating drive signals in accordance with the data stored in the band memory 1205. As used herein, the term "dot skipping" refers to a procedure in which a pixel (recording pixel) with a dot is changed to a pixel (non-recording pixel) without a dot.

The external device 1220 corresponds to the dot data generator referred to in the claims, the contour line extraction means 1202 corresponds to the contour line extractor referred to in the claims, and the skipping means 1203 and fill-in means 1204 correspond to the ink amount reducer referred to in the claims.

The dot data 1221 forwarded by the external device 1220 are stored in the recording data storage means 1201. When printing is started, a CPU 1222 reads the dot data 1221 from the recording data storage means 1201 and forwards the result to the contour line extraction means 1202 and skipping means 1203. The contour line extraction means 1202 extracts a contour line from the dot data 1221, generates contour line data, and forwards the contour line data to the skipping means 1203. The skipping means 1203 performs a skipping procedure (that is, deletes dots from specific pixels) in accordance with the dot data 1221 and contour line data. The fill-in means 1204 receives data for expressing the deleted dots from the skipping means 1203.

Contour lines may be extracted in the following manner. A contour line may, for example, be extracted using a known filter such as the first derivation filter shown in FIG. 27a. According to the present working example, a contour line may be extracted using a first derivation filter such as the Prewitt filter shown in FIG. 27b.

Figure 28A:
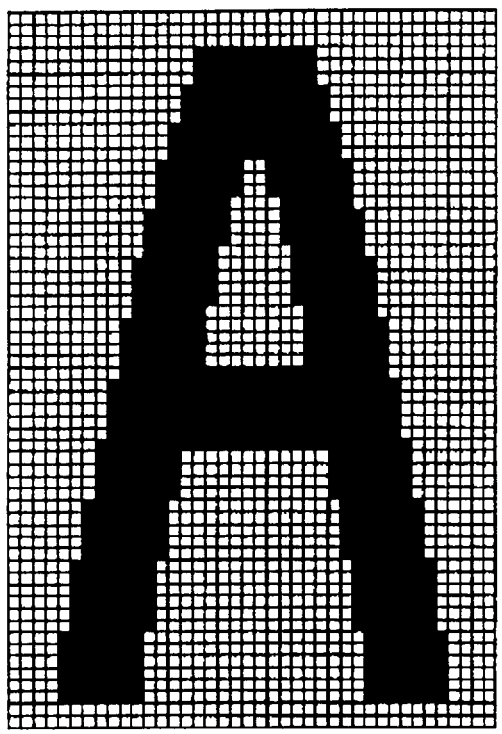
FIGS. 28(a) and 28(b) are diagrams depicting the process for extracting the contour line of text A according to the fourth working example of the present invention.
Figure 28B:
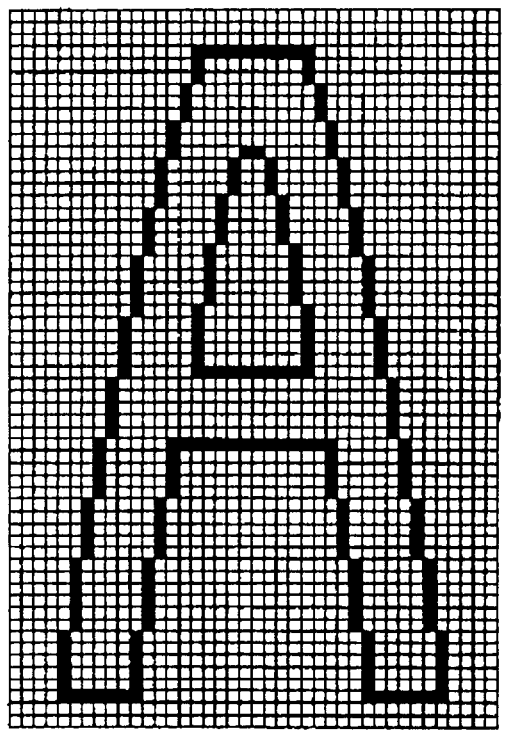

FIG. 28 is a diagram depicting the process for extracting the contour line of text A according to the fourth working example of the present invention. FIG. 28a is a diagram depicting dot data for expressing text A. FIG. 28b is a diagram depicting the results obtained by extracting a contour line with a pixel width of 1 from the dot data shown in FIG. 28a.

Specifically, the skipping means 1203 and fill-in means 1204 perform skipping and fill-in procedures in the following manner. According to the present example, an area whose width is equal to a single pixel and which is disposed on the inside of a pixel for forming a contour line is filled with smaller dots and is subjected to dot skipping.

Figure 29:
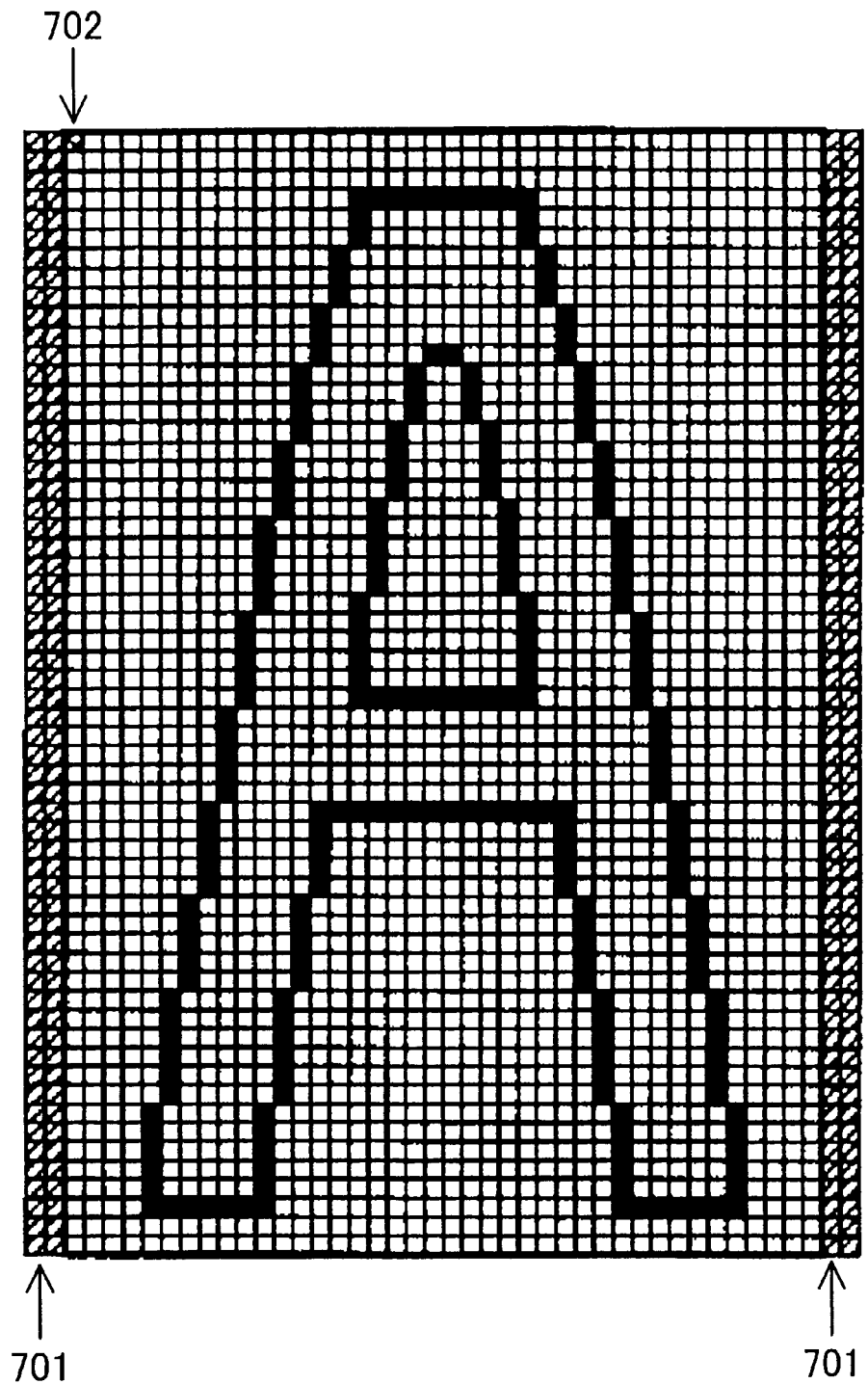
FIG. 29 is a diagram depicting the contour line data compiled according to the fourth working example of the present invention.

The skipping means 1203 receives contour line data from the contour line extraction means 1202. The contour line data contains dummy data 1701 for two pixels (one in front and one behind in the direction of main scanning in the area being recorded), as shown in FIG. 29. The presence of such dummy data allows the procedure to be started from pixel 1702, which is disposed at the edge of the recording area.

FIG. 30 is a diagram depicting the progress of the skipping and fill-in procedures performed in accordance with the fourth working example of the present invention. FIG. 30a depicts the tenth line of data in the contour line data shown n FIG. 29. These data are processed in the following sequence.

(1) For the data shown in FIG. 30a, the areas interposed between contour lines are blacked out. Data such as that shown in FIG. 30a are produced as a result.

(2) The data shown in FIG. 30b are shifted two pixels to the left. Data such as that shown in FIG. 30c are produced as a result.

(3) The data shown in FIG. 30b are shifted two pixels to the right. Data such as that shown in FIG. 30d are produced as a result.

(4) A logical product of the data shown in FIG. 30c and the data shown in FIG. 30d is obtained. Data such as that shown in FIG. 30e are produced as a result.

(5) A logical sum of the data shown in FIG. 30a and the data shown in FIG. 30e is obtained. Data such as that shown in FIG. 30f are produced as a result.

(6) An exclusive or logical sum of the data shown in FIG. 30b and the data shown in FIG. 30f is obtained. Data such as that shown in FIG. 30g are produced as a result.

Figure 31:
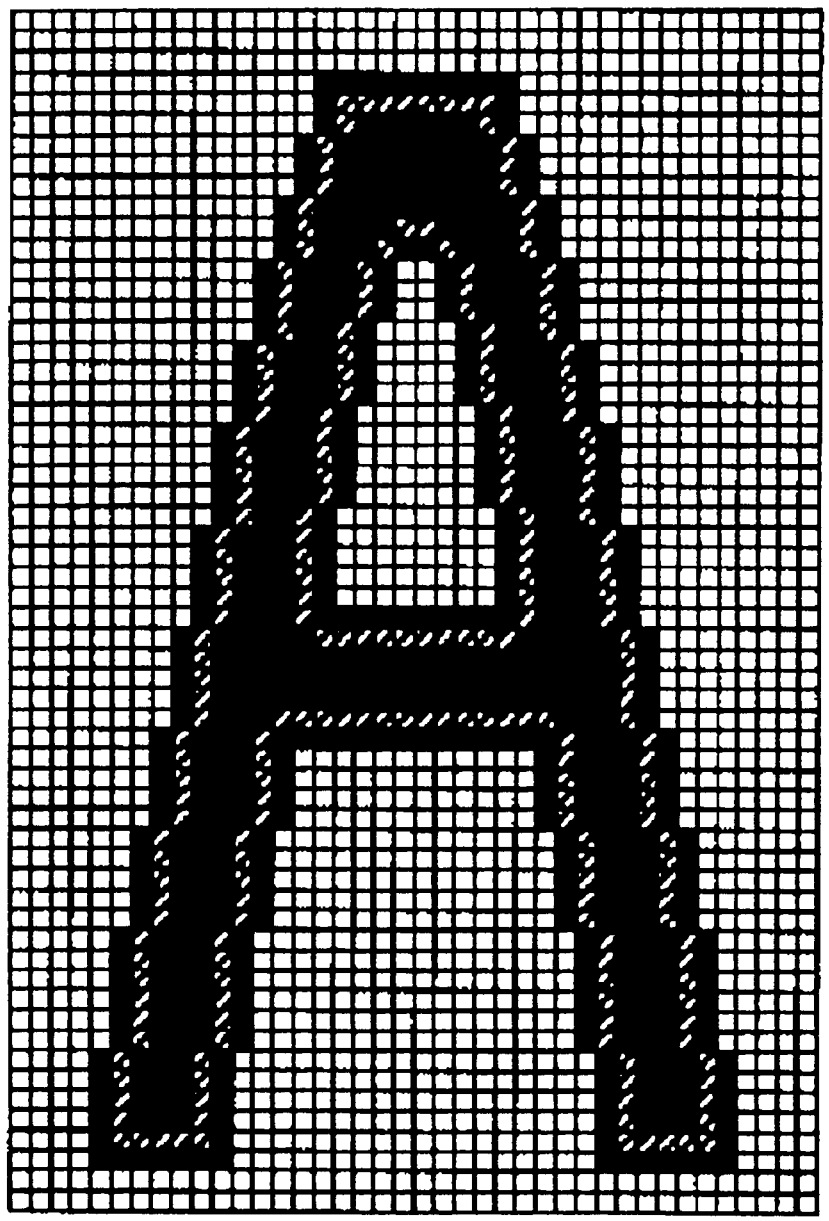
FIG. 31 is a diagram depicting the images printed after the skipping and fill-in procedures have been performed regarding text A in accordance with the fourth working example of the present invention.

The dot data 1223 (FIG. 26) obtained as described above by performing the skipping procedure shown in FIG. 30f are sent and stored in the band memory 1205, as are the fill-in data 1224 shown in FIG. 30g. The head drive means 1206 generates a head drive signal and allows the recording head 1101 to operate in accordance with these data. Specifically, a drive signal for ejecting ink droplets designed to form large dots is generated in accordance with the dot data 1223 resulting from the skipping procedure shown in FIG. 30f, and a drive signal for ejecting ink droplets designed to form small dots is generated in accordance with the data 1224 shown in FIG. 30g. The recording head 1101 ejects large or small dots and forms characters or line drawings on the recording medium 1107 in accordance with these drive signals. A printed image such as the one shown in FIG. 31 is produced as a result.

Adopting an approach in which the amount of ink supplied for the dots formed in the pixels inscribed in a contour line is reduced by shrinking the dots in this manner is advantageous because the bleeding of the contour line can be reduced without creating excessive voids.

Although the present example was described with reference to a case in which a single pixel was selected as the width of the area filled in with smaller dots or subjected to dot skipping, it is also possible, for example, to adopt an arrangement in which the width is increased to two pixels. The pixel width can be adjusted by increasing the amount of shifting from two to three pixels when, for example, data such as that shown in FIG. 30c or 30d are generated.

G. Modifications

The present invention is not limited to the above-described working examples or embodiments and can be implemented in a variety of ways as long as its essence is not compromised. For example, the following modifications are possible.

G-1. In the above-described working examples, a contour line constitutes a boundary with an area in which ink dots are completely absent. However, the contour line is not limited to this option alone and can be any discontinuity whose unique attributes define the area. For example, the contour line may visually define a boundary that divides different color tones. The present invention makes it possible to reduce bleeding from such outlines as well. This is because the bleeding from such outlines also has an adverse effect on picture quality. In such cases, some ink dots are skipped or fashioned to a different size in at least one such area.

G-2. The amount of ink may also be reduced in accordance with print resolution. For example, it is possible to reduce the amount of ink only when the print resolution exceeds 600 dpi in the direction of main scanning and/or direction of sub-scan. This is because bleeding from contour lines increases with increased print resolution and becomes particularly pronounced at a resolution of 600 dpi or greater.

G-3. Although the above working examples were described with reference to a case in which the print mode parameters used to define the specifics of a skipping procedure included print medium type, ink color, and print resolution, other possible examples may include those in which the specifics of the skipping procedure are defined based on the use of different types of ink, such as superhigh permeation ink and low permeation ink. Any approach can commonly be adopted as long as the specifics of the skipping procedure can be defined in accordance with the print mode parameters that affect the bleeding of contour lines.

As used herein, the terms "superhigh permeation ink" and "low permeation ink" refer to the relative characteristics of such inks. Specifically, a superhigh permeation ink penetrates into a print medium faster than does a low permeation ink when equal amounts of both types of ink are fed in drops onto a standard print medium (plain paper, for example). An ink with a surface tension of less than about $40 \times 10^{-3}$ N/m at about 20° C. may, for example, be used as superhigh permeation ink. An ink with a surface tension of greater than about $40 \times 10^{-3}$ N/m at about 20° C. may be used as low permeation ink. Either dyes or pigments can be used as colorants for such superhigh or low permeation inks.

G-4. Although the above working examples were described with reference to cases in which the type of print medium was specified by selecting the print mode, it is also possible to adopt an approach in which the type of print medium is specified by providing the printing device with a means for automatically specifying the type of print medium. It is commonly possible to adopt any arrangement in which the specifics of the skipping procedure are defined in accordance with the type of print medium.

Examples of the means for automatically specifying the type of print medium include optical selection means for detecting reflected light and making a selection on the basis of the difference in optical reflectance between specialty paper and plain paper, bar code reading means for making a selection by reading a bar code provided in advance to a recording medium or packaging, and means for making a selection with the aid of an IC reader. Such means have the advantage of freeing the user from the need to specify the type of print medium, and the means for specifying the type of print medium by selecting the print mode have the additional advantage of being implemented in a simple structure.

G-5. The above working example were described with reference to cases in which halftone data were processed, contour lines were extracted, and the amount of ink was reduced using the results. The method for extracting contour lines is not limited to this option alone, however. When, for example, images are printed using data for specifying contour lines (as is the case with outline data), it is possible to adopt an approach in which the amount of ink is reduced by the direct use of contour line data obtained from these outline data. Specifically, the present invention can be adapted to a technique for reducing the bleeding of contour lines by processing dot data for expressing the formation geometry of ink dots.

Figure 32A:
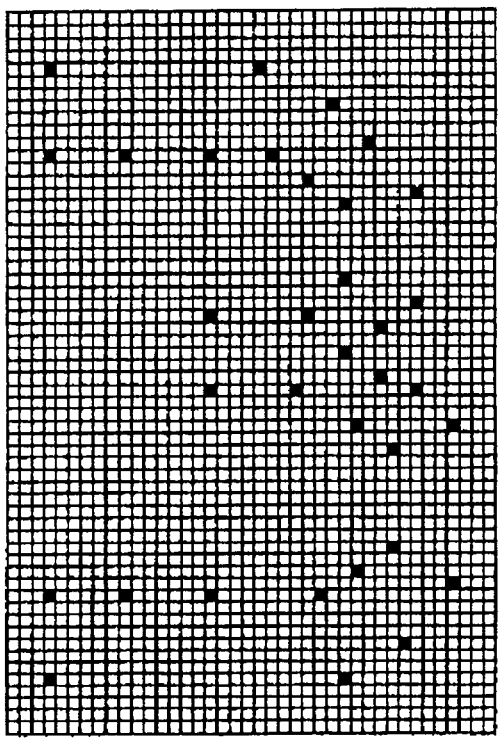
FIGS. 32(a)–32(c) are diagrams depicting a process in which text B is created with an outline font.
Figure 32B:
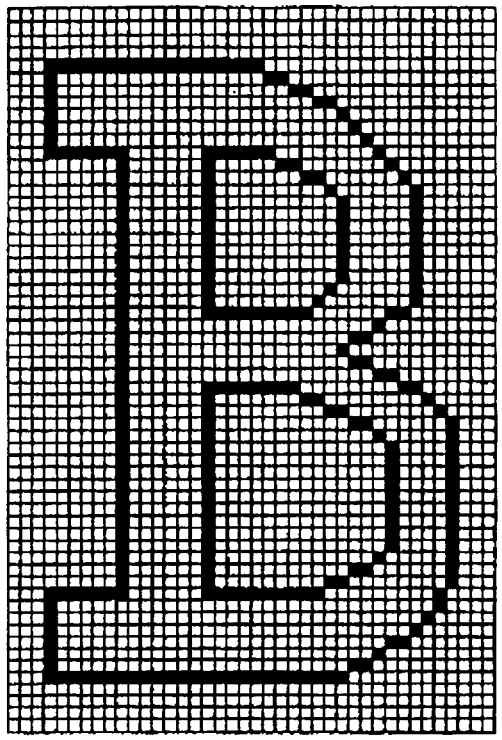
Figure 32C:
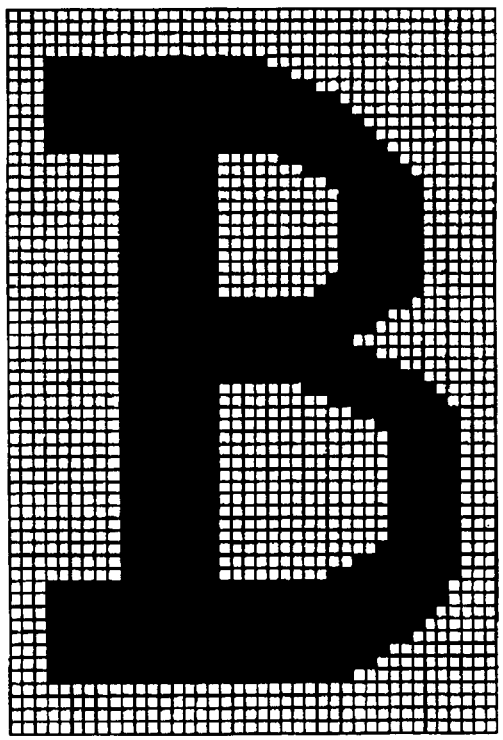

FIG. 32 is diagram depicting a process in which text B is created with an outline font. FIG. 32a is a diagram depicting discreet points for forming the outline of text B. Complementing these dots with straight lines can yield data for expressing the contour lines of text B, as shown in FIG. 32b. Data for expressing text B such as the one shown in FIG. 32c can be further obtained by processing the data configured to the area inside these contour lines is blacked out. Data for expressing contour lines can thus be generated as print data without extracting the contour lines when a text is created with an outline font. The dot data generator functions as a contour line extractor when texts are created with an outline font.

G-6. The present invention can be adapted not only to color printing but also to monochromatic printing. The invention can also be adapted to printing in which multiple gray scales are expressed by expressing a single pixel with a plurality of ink dots. Using the present invention with drum printers is yet another option. In a drum printer, the direction of drum rotation corresponds to main scanning; the direction of carriage travel, to sub-scan. Finally, the present invention can be adapted not only to ink-jet printers but also to any other common ink-jet recording device in which images are recorded on the surface of a print medium with the aid of a recording head having a plurality of nozzle arrays.

G-7. In the above working examples, software can be used to perform some of the hardware functions, or, conversely, hardware can be used to perform some of the software functions. For example, some or all of the functions performed by the printer driver 96 shown in FIG. 2 or 20 can be performed by the control circuit 40 inside the printer 20. In this case, some or all of the functions performed by the computer 88, which is a print control device for compiling print data, can be performed by the control circuit 40 of the printer 20.

When some or all of the functions of the present invention are performed by software, this software (computer programs) can be furnished after being stored on a computer-readable recording medium. As used herein, the term "computer-readable recording medium" is not limited to portable recording media such as floppy disks or CD-ROMs and also includes RAM, ROM, and other internal computer storage devices, as well as hard disks and other external storage devices immovably mounted in computers.

What is claimed is:

1. A printing control apparatus for generating print data to be supplied to a printing unit to perform printing during main scans, the printing control apparatus comprising:

a dot data generator configured to generate dot data from image data indicative of a image to be printed, the dot data representing a state of dot formation at each pixel;

a contour line extractor configured to extract a first type contour line of a specific type image area represented by the dot data, the first contour line being parallel to a main scan direction, the specific type image area being composed of pixels at which specific type dots are to be formed; and a dot data adjuster configured to adjust the dot data so as to regularly reduce an amount of ink for forming dots on the first contour line.

2. The printing control apparatus in accordance with claim 1, wherein the contour line extractor is configured to further extract a second contour line of the specific type image area, the second contour line being not parallel to the main scan direction; and the dot data adjuster is configured to adjust the dot data so as to maintain the amount of ink for forming dots at pixels on the second contour line even if these pixels are on the first contour line.

3. The printing control apparatus in accordance with claim 1, wherein the contour line extractor is configured to further extract a second contour line of the specific type image area, the second contour line being not parallel to the main scan direction; and the dot data adjuster is configured to adjust the dot data so as to regularly reduce the amount of ink for forming dots at pixels next to the first and/or the second contour line.

4. The printing control apparatus in accordance with claim 1, wherein the printing unit comprises a print head having a plurality of nozzles and a plurality of ejection driving elements for causing ejection of ink droplets respectively from the plurality of nozzles, each nozzle being adaptable to form a selected one of N different dots having different sizes at one pixel area on the print medium, N being an integer of at least 2, the N different dots including a specific size dot that is one of comparatively large dots among the N different dots; and the dot data adjuster is configured to adjust the dot data so as to reduce the amount of ink when the first contour line is formed with the specific size dot.

5. The printing control apparatus in accordance with claim 4, wherein the dot data adjuster is configured to adjust the dot data so as to reduce the amount of ink by reducing dot size.

6. The printing control apparatus in accordance with claim 4, wherein the dot data adjuster is configured to adjust the dot data so as to reduce the amount of ink by selectively performing one of dot skipping and dot size reduction, depending on a pixel position of each dot within the specific image area.

7. The printing control apparatus in accordance with claim 1, wherein the dot data adjuster is configured to adjust the dot data so as to reduce the amount of ink by dot skipping.

8. The printing control apparatus in accordance with claim 1, wherein the print unit is capable of printing images with a print resolution of 600 dpi or greater in the main scan direction; and the dot data adjuster is configured to adjust the dot data so as to reduce the amount of ink when printing with a print resolution of 600 dpi or greater in the main scan direction.

9. The printing control apparatus in accordance with claim 1, wherein
the dot data adjuster is configured to adjust the dot data so as to reduce the amount of ink when the print medium is a plain paper.

10. A printing apparatus for forming ink dots with a printing unit to perform printing during main scans, the printing apparatus comprising:
the print unit; and
a print control apparatus, the print control apparatus comprising:
a dot data generator configured to generate dot data from image data indicative of a image to be printed, the dot data representing a state of dot formation at each pixel;
a contour line extractor configured to extract a first type contour line of a specific type image area represented by the dot data, the first contour line being parallel to a main scan direction, the specific type image area being composed of pixels at which specific type dots are to be formed; and
a dot data adjuster configured to adjust the dot data so as to regularly reduce an amount of ink for forming dots on the first contour line.

11. The printing apparatus in accordance with claim 10, wherein
the contour line extractor is configured to further extract a second contour line of the specific type image area, the second contour line being not parallel to the main scan direction; and
the dot data adjuster is configured to adjust the dot data so as to maintain the amount of ink for forming dots at pixels on the second contour line even if these pixels are on the first contour line.

12. The printing apparatus in accordance with claim 10, wherein
the contour line extractor is configured to further extract a second contour line of the specific type image area, the second contour line being not parallel to the main scan direction; and
the dot data adjuster is configured to adjust the dot data so as to regularly reduce the amount of ink for forming dots at pixels next to the first and/or the second contour line.

13. The printing apparatus in accordance with claim 10, wherein
the printing unit comprises a print head having a plurality of nozzles and a plurality of ejection driving elements for causing ejection of ink droplets respectively from the plurality of nozzles, each nozzle being adaptable to form a selected one of N different dots having different sizes at one pixel area on the print medium, N being an integer of at least 2, the N different dots including a specific size dot that is one of comparatively large dots among the N different dots; and
the dot data adjuster is configured to adjust the dot data so as to reduce the amount of ink when the first contour line is formed with the specific size dot.

14. The printing apparatus in accordance with claim 13, wherein
the dot data adjuster is configured to adjust the dot data so as to reduce the amount of ink by reducing dot size.

15. The printing apparatus in accordance with claim 13, wherein
the dot data adjuster is configured to adjust the dot data so as to reduce the amount of ink by selectively performing one of dot skipping and dot size reduction, depending on a pixel position of each dot within the specific image area.

16. The printing apparatus in accordance with claim 10, wherein
the dot data adjuster is configured to adjust the dot data so as to reduce the amount of ink by dot skipping.

17. The printing apparatus in accordance with claim 10, wherein
the print unit is capable of printing images with a print resolution of 600 dpi or greater in the main scan direction; and
the dot data adjuster is configured to adjust the dot data so as to reduce the amount of ink when printing with a print resolution of 600 dpi or greater in the main scan direction.

18. The printing apparatus in accordance with claim 10, wherein
the dot data adjuster is configured to adjust the dot data so as to reduce the amount of ink when the print medium is a plain paper.

19. A method of printing by forming ink dots on a print medium, comprising the steps of:
(a) generating dot data from image data indicative of a image to be printed, the dot data representing a state of dot formation at each pixel;
(b) extracting a first type contour line of a specific type image area represented by the dot data, the first contour line being parallel to a main scan direction, the specific type image area being composed of pixels at which specific type dots are to be formed; and
(c) adjusting the dot data so as to regularly reduce an amount of ink for forming dots on the first contour line.

20. The method in accordance with claim 19, wherein
the step(b) includes the step of extracting a second contour line of the specific type image area, the second contour line being not parallel to the main scan direction; and
the step(c) includes the step of adjusting the dot data so as to maintain the amount of ink for forming dots at pixels on the second contour line even if these pixels are on the first contour line.

21. The method in accordance with claim 19, wherein
the step(b) includes the step of further extracting a second contour line of the specific type image area, the second contour line being not parallel to the main scan direction; and
the step(c) includes the step of adjusting the dot data so as to regularly reduce the amount of ink for forming dots at pixels next to the first and/or the second contour line.

22. The method in accordance with claim 19, wherein
the printing unit comprises a print head having a plurality of nozzles and a plurality of ejection driving elements for causing ejection of ink droplets respectively from the plurality of nozzles, each nozzle being adaptable to form a selected one of N different dots having different sizes in one pixel area on the print medium, N being an integer of at least 2, the N different dots including a specific size dot that is one of comparatively large dots among the N different dots; and
the step(c) includes the step of adjusting the dot data so as to reduce the amount of ink when the first contour line is formed with the specific size dot.

23. The method in accordance with claim 22, wherein
the step(c) includes the step of adjusting the dot data so as to reduce the amount of ink by reducing dot size.

24. The method in accordance with claim 22, wherein the step(c) includes the step of adjusting the dot data so as to reduce the amount of ink by selectively performing one of dot skipping and dot size reduction, depending on a pixel position of each dot within the specific image area.

25. The method in accordance with claim 19, wherein the step(c) includes the step of adjusting the dot data so as to reduce the amount of ink by dot skipping.

26. The method in accordance with claim 19, wherein the print unit is capable of printing images with a print resolution of 600 dpi or greater in the main scan direction; and the step(c) includes the step of adjusting the dot data so as to reduce the amount of ink when printing with a print resolution of 600 dpi or greater in the main scan direction.

27. The method in accordance with claim 19, wherein the step(c) includes the step of adjusting the dot data so as to reduce the amount of ink when the print medium is a plain paper.

28. A computer program product for causing a computer to generate print data to be supplied to a printing unit to perform printing during main scans, the computer program product comprising:

a computer readable medium; and a computer program stored on the computer readable medium, the computer program comprising:

a first program for causing the computer to generate dot data from image data indicative of a image to be printed, the dot data representing a state of dot formation at each pixel;

a second program for causing the computer to extract a first type contour line of a specific type image area represented by the dot data, the first contour line being parallel to a main scan direction, the specific type image area being composed of pixels at which specific type dots are to be formed; and a third program for causing the computer to adjust the dot data so as to regularly reduce an amount of ink for forming dots on the first contour line.

29. The computer program product in accordance with 28, wherein the second program is configured to further extract a second contour line of the specific type image area, the second contour line being not parallel to the main scan direction; and the third program is configured to adjust the dot data so as to maintain the amount of ink for forming dots at pixels on the second contour line even if these pixels are on the first contour line.

30. The computer program product in accordance with 28, wherein the second program is configured to further extract a second contour line of the specific type image area, the second contour line being not parallel to the main scan direction; and the third program is configured to adjust the dot data so as to regularly reduce the amount of ink for forming dots at pixels next to the first and/or the second contour line.

31. The computer program product in accordance with 28, wherein the printing unit comprises a print head having a plurality of nozzles and a plurality of ejection driving elements for causing ejection of ink droplets respectively from the plurality of nozzles, each nozzle being adaptable to form a selected one of N different dots having different sizes at one pixel area on the print medium, N being an integer of at least 2, the N different dots including a specific size dot that is one of comparatively large dots among the N different dots; and the third program is configured to adjust the dot data so as to reduce the amount of ink when the first contour line is formed with the specific size dot.

32. The computer program product in accordance with 31, wherein the third program is configured to adjust the dot data so as to reduce the amount of ink by reducing dot size.

33. The computer program product in accordance with 31, wherein the third program is configured to adjust the dot data so as to reduce the amount of ink by selectively performing one of dot skipping and dot size reduction, depending on a pixel position of each dot within the specific image area.

34. The computer program product in accordance with 28, wherein the third program is configured to adjust the dot data so as to reduce the amount of ink by dot skipping.

35. The computer program product in accordance with 28, wherein the print unit is capable of printing images with a print resolution of 600 dpi or greater in the main scan direction; and the third program is configured to adjust the dot data so as to reduce the amount of ink when printing with a print resolution of 600 dpi or greater in the main scan direction.

36. The computer program product in accordance with 28, wherein the third program is configured to adjust the dot data so as to reduce the amount of ink when the print medium is a plain paper.

37. A printing control apparatus for generating print data to be supplied to a printing unit capable of printing images on a print medium with one of a plurality of print resolutions, the printing control apparatus comprising:

a dot data generator configured to generate dot data from image data indicative of a image to be printed, the dot data representing a state of dot formation at each pixel;

a contour line extractor configured to extract a transverse contour line parallel to a main scan direction under a specific condition, the transverse contour line being a contour line of a specific type image area being composed of pixels at which specific type dots are to be formed according to the dot data, the specific condition being that a first value is greater than a predetermined first threshold, the first value being obtained by dividing a length of the specific type dot in a main scan direction by a pixel length in the main scan direction corresponding to a selected one of the plurality of print resolutions to be used by the printing unit; and a dot data adjuster configured to adjust the dot data so as to regularly reduce an amount of ink for forming dots on the transverse contour line.

38. The printing control apparatus in accordance with claim 37, wherein the dot data adjuster is configured to adjust the dot data so as to maintain the amount of ink for forming the specific dots at pixels, if at least one of two next pixels in the main scan direction to these pixels is not subject to dot formation.

39. The printing control apparatus in accordance with claim 37, wherein the print unit is capable of printing images with a print resolution of 600 dpi or greater in the main scan direction; and the dot data adjuster is configured to adjust the dot data so as to reduce the amount of ink when printing is performed with a print resolution of 600 dpi or greater in the main scan direction.

40. The printing control apparatus in accordance with claim 39, wherein the first threshold is 2.0; and the dot data adjuster is configured to adjust the dot data so as to reduce the amount of ink when the print medium is a plain paper.

41. The printing control apparatus in accordance with claim 39, wherein the first threshold is 1.8; and the dot data adjuster is configured to adjust the dot data so as to reduce the amount of ink when the print medium is a plain paper.

42. The printing control apparatus in accordance with claim 37, wherein the contour line extractor is configured to further extract a longitudinal contour line parallel to a sub-scan direction under a specific condition, the longitudinal contour line being a contour line of a specific type image area being composed of pixels at which specific type dots are to be formed according to the dot data, the specific condition being that a second value is greater than a predetermined second threshold, the second value being obtained by dividing a length of the specific type dot in a sub-scan direction by a pixel length in the sub-scan direction corresponding to a selected one of the plurality of print resolutions to be used by the printing unit; and the dot data adjuster is configured to adjust the dot data so as to further regularly reduce the amount of ink for forming dots on the longitudinal contour line.

43. The printing control apparatus in accordance with claim 42, wherein the print unit is capable of printing images with a print resolution of 1200 dpi or greater in the main scan direction and/or sub-scan direction; and the dot data adjuster is configured to adjust the dot data so as to reduce the amount of ink for the dots on the transverse contour line and/or on the longitudinal contour line, when printing is performed with a print resolution of 1200 dpi or greater in the main scan direction and in the sub-scan direction.

44. A printing apparatus for forming ink dots with a printing unit capable of printing images on a print medium with one of a plurality of print resolutions, the printing apparatus comprising:

the print unit; and a print control apparatus, the print control apparatus comprising:

a dot data generator configured to generate dot data from image data indicative of a image to be printed, the dot data representing a state of dot formation at each pixel;

a contour line extractor configured to extract a transverse contour line parallel to a main scan direction under a specific condition, the transverse contour line being a contour line of a specific type image area being composed of pixels at which specific type dots are to be formed according to the dot data, the specific condition being that a first value is greater than a predetermined first threshold, the first value being obtained by dividing a length of the specific type dot in a main scan direction by a pixel length in the main scan direction corresponding to a selected one of the plurality of print resolutions to be used by the printing unit; and a dot data adjuster configured to adjust the dot data so as to regularly reduce an amount of ink for forming dots on the transverse contour line.

45. The printing apparatus in accordance with claim 44, wherein the dot data adjuster is configured to adjust the dot data so as to maintain the amount of ink for forming the specific dots at pixels, if at least one of two next pixels in the main scan direction to these pixels is not subject to dot formation.

46. The printing apparatus in accordance with claim 44, wherein the print unit is capable of printing images with a print resolution of 600 dpi or greater in the main scan direction; and the dot data adjuster is configured to adjust the dot data so as to reduce the amount of ink when printing is performed with a print resolution of 600 dpi or greater in the main scan direction.

47. The printing apparatus in accordance with claim 46, wherein the first threshold is 2.0; and the dot data adjuster is configured to adjust the dot data so as to reduce the amount of ink when the print medium is a plain paper.

48. The printing apparatus in accordance with claim 46, wherein the first threshold is 1.8; and the dot data adjuster is configured to adjust the dot data so as to reduce the amount of ink when the print medium is a plain paper.

49. The printing apparatus in accordance with claim 44, wherein the contour line extractor is configured to further extract a longitudinal contour line parallel to a sub-scan direction under a specific condition, the longitudinal contour line being a contour line of a specific type image area being composed of pixels at which specific type dots are to be formed according to the dot data, the specific condition being that a second value is greater than a predetermined second threshold, the second value being obtained by dividing a length of the specific type dot in a sub-scan direction by a pixel length in the sub-scan direction corresponding to a selected one of the plurality of print resolutions to be used by the printing unit; and the dot data adjuster is configured to adjust the dot data so as to further regularly reduce the amount of ink for forming dots on the longitudinal contour line.

50. The printing apparatus in accordance with claim 49, wherein the print unit is capable of printing images with a print resolution of 1200 dpi or greater in the main scan direction and/or sub-scan direction; and the dot data adjuster is configured to adjust the dot data so as to reduce the amount of ink for the dots on the transverse contour line and/or on the longitudinal contour line, when printing is performed with a print resolution of 1200 dpi or greater in the main scan direction and in the sub-scan direction.

51. A method of printing by forming ink dots with a printing unit capable of printing images on a print medium with one of a plurality of print resolutions, comprising the steps of:

(a) generating dot data from image dot data from image data indicative of a image to be printed, the dot data representing a state of dot formation at each pixel;

(b) extracting a transverse contour line parallel to a main scan direction under a specific condition, the transverse contour line being a contour line of a specific type image area being composed of pixels at which specific type dots are to be formed according to the dot data, the specific condition being that a first value is greater than a predetermined first threshold, the first value being obtained by dividing a length of the specific type dot in a main scan direction by a pixel length in the main scan direction corresponding to a selected one of the plurality of print resolutions to be used by the printing unit; and (c) adjusting the dot data so as to regularly reduce an amount of ink for forming dots on the transverse contour line.

52. The method in accordance with claim 51, wherein
the step(c) includes the step of adjusting the dot data so as to maintain the amount of ink for forming the specific dots at pixels, if at least one of two next pixels in the main scan direction to these pixels is not subject to dot formation.

53. The method in accordance with claim 51, wherein
the print unit is capable of printing images with a print resolution of 600 dpi or greater in the main scan direction; and
the step(c) includes the step of adjusting the dot data so as to reduce the amount of ink when printing is performed with a print resolution of 600 dpi or greater in the main scan direction.

54. The method in accordance with claim 53, wherein
the first threshold is 2.0; and
the step(c) includes the step of adjusting the dot data so as to reduce the amount of ink when the print medium is a plain paper.

55. The method in accordance with claim 53, wherein
the first threshold is 1.8; and
the step(c) includes the step of adjusting the dot data so as to reduce the amount of ink when the print medium is a plain paper.

56. The method in accordance with claim 51, wherein
the step(b) includes the step of further extracting a longitudinal contour line parallel to a sub-scan direction under a specific condition, the longitudinal contour line being a contour line of a specific type image area being composed of pixels at which specific type dots are to be formed according to the dot data, the specific condition being that a second value is greater than a predetermined second threshold, the second value being obtained by dividing a length of the specific type dot in a sub-scan direction by a pixel length in the sub-scan direction corresponding to a selected one of the plurality of print resolutions to be used by the printing unit; and the dot data adjuster is configured to adjust the dot data so as to further regularly reduce the amount of ink for forming dots on the longitudinal contour line.

57. The method in accordance with claim 56, wherein
the print unit is capable of printing images with a print resolution of 1200 dpi or greater in the main scan direction and/or sub-scan direction; and
the step(c) includes the step of adjusting the dot data so as to reduce the amount of ink for the dots on the transverse contour line and/or on the longitudinal contour line, when printing is performed with a print resolution of 1200 dpi or greater in the main scan direction and in the sub-scan direction.

58. A computer program product for causing a computer to generate print data to be supplied to a printing unit capable of printing images on a print medium with one of a plurality of print resolutions, the computer program product comprising:

a computer readable medium; and
a computer program stored on the computer readable medium, the computer program comprising:
a first program for causing the computer to generate dot data from image data indicative of a image to be printed, the dot data representing a state of dot formation at each pixel;
a second program for causing the computer to extract a transverse contour line parallel to a main scan direction under a specific condition, the transverse contour line being a contour line of a specific type image area being composed of pixels at which specific type dots are to be formed according to the dot data, the specific condition being that a first value is greater than a predetermined first threshold, the first value being obtained by dividing a length of the specific type dot in a main scan direction by a pixel length in the main scan direction corresponding to a selected one of the plurality of print resolutions to be used by the printing unit; and
a third program for causing the computer to adjust the dot data so as to regularly reduce an amount of ink for forming dots on the transverse contour line.

59. The computer program product in accordance with claim 58, wherein
the third program is configured to adjust the dot data so as to maintain the amount of ink for forming the specific dots at pixels, if at least one of two next pixels in the main scan direction to these pixels is not subject to dot formation.

60. The computer program product in accordance with claim 58, wherein
the print unit is capable of printing images with a print resolution of 600 dpi or greater in the main scan direction; and
the third program is configured to adjust the dot data so as to reduce the amount of ink when printing is performed with a print resolution of 600 dpi or greater in the main scan direction.

61. The computer program product in accordance with claim 60, wherein
the first threshold is 2.0; and
the third program is configured to adjust the dot data so as to reduce the amount of ink when the print medium is a plain paper.

62. The computer program product in accordance with claim 60, wherein
the first threshold is 1.8; and the third program is configured to adjust the dot data so as to reduce the amount of ink when the print medium is a plain paper.

63. The computer program product in accordance with claim 58, wherein the second program is configured to further extract a longitudinal contour line parallel to a sub-scan direction under a specific condition, the longitudinal contour line being a contour line of a specific type image area being composed of pixels at which specific type dots are to be formed according to the dot data, the specific condition being that a second value is greater than a predetermined second threshold, the second value being obtained by dividing a length of the specific type dot in a sub-scan direction by a pixel length in the sub-scan direction corresponding to a selected one of the plurality of print resolutions to be used by the printing unit; and the third program is configured to adjust the dot data so as to further regularly reduce the amount of ink for forming dots on the longitudinal contour line.

64. The computer program product in accordance with claim 63, wherein the print unit is capable of printing images with a print resolution of 1200 dpi or greater in the main scan direction and/or sub-scan direction; and the third program is configured to adjust the dot data so as to reduce the amount of ink for the dots on the transverse contour line and/or on the longitudinal contour line, when printing is performed with a print resolution of 1200 dpi or greater in the main scan direction and in the sub-scan direction.

65. A printing control apparatus for generating print data to be supplied to a printing unit capable of printing images on a print medium with one of a plurality of print resolutions, the printing control apparatus comprising:

a dot data generator configured to generate dot data from image data indicative of a image to be printed, the dot data representing a state of dot formation at each pixel;

a contour line extractor is configured to extract a longitudinal contour line parallel to a sub-scan direction under a specific condition, the longitudinal contour line being a contour line of a specific type image area being composed of pixels at which specific type dots are to be formed according to the dot data, the specific condition being that a second value is greater than a predetermined second threshold, the second value being obtained by dividing a length of the specific type dot in a sub-scan direction by a pixel length in the sub-scan direction corresponding to a selected one of the plurality of print resolutions to be used by the printing unit; and a dot data adjuster configured to adjust the dot data so as to regularly reduce the amount of ink for forming dots on the longitudinal contour line.

66. The printing control apparatus in accordance with claim 65, wherein the dot data adjuster is configured to adjust the dot data so as to maintain the amount of ink for forming the specific dots at pixels, if at least one of two next pixels in the sub-scan direction to these pixels is not subject to dot formation.

67. The printing control apparatus in accordance with claim 65, wherein the print unit is capable of printing images with a print resolution of 600 dpi or greater in the sub-scan direction; and the dot data adjuster is configured to adjust the dot data so as to reduce the amount of ink when printing is performed with a print resolution of 600 dpi or greater in the sub-scan direction.

68. The printing control apparatus in accordance with claim 67, wherein the printing unit comprises a print head having at least one nozzle array in which a plurality of nozzles are aligned in the sub-scan direction at a nozzle pitch of $\frac{1}{300}$th of an inch or less; and the dot data adjuster is configured to adjust the dot data so as to reduce the amount of ink when being ejected from the nozzle array.

69. The printing control apparatus in accordance with claim 68, wherein the second threshold is 2.0; and the dot data adjuster is configured to adjust the dot data so as to reduce the amount of ink when the print medium is a plain paper.

70. The printing control apparatus in accordance with claim 68, wherein the second threshold is 1.8; and the dot data adjuster is configured to adjust the dot data so as to reduce the amount of ink when the print medium is a plain paper.

71. The printing control apparatus in accordance with claim 65, wherein the printing unit comprises a print head having a plurality of nozzles and a plurality of ejection driving elements for causing ejection of ink droplets respectively from the plurality of nozzles, each nozzle being adaptable to form a selected one of N different dots having different sizes at one pixel area on the print medium, N being an integer of at least 2, the N different dots including a specific size dot that is one of comparatively large dots among the N different dots; and the dot data adjuster is configured to adjust the dot data so as to reduce the amount of ink when the longitudinal contour line is formed with the specific size dot.

72. The printing control apparatus in accordance with claim 65, wherein the dot data adjuster is configured to adjust the dot data so as to reduce the amount of ink when the print medium is a plain paper.

73. The printing control apparatus in accordance with claim 65, wherein the dot data adjuster is configured to adjust the dot data so as to reduce the amount of ink by dot skipping.

74. The printing control apparatus in accordance with claim 65, wherein the dot data adjuster is configured to adjust the dot data so as to reduce the amount of ink by reducing dot size.

75. The printing control apparatus in accordance with claim 65, wherein the dot data adjuster is configured to adjust the dot data so as to reduce the amount of ink by selectively performing one of dot skipping and dot size reduction, depending on a pixel position of each dot within the specific image area.

76. A printing apparatus for forming ink dots with a printing unit capable of printing images on a print medium with one of a plurality of print resolutions, the printing apparatus comprising:

the print unit; and a print control apparatus, the print control apparatus comprising:

a dot data generator configured to generate dot data from image data indicative of a image to be printed, the dot data representing a state of dot formation at each pixel;

a contour line extractor is configured to extract a longitudinal contour line parallel to a sub-scan direction under a specific condition, the longitudinal contour line being a contour line of a specific type image area being composed of pixels at which specific type dots are to be formed according to the dot data, the specific condition being that a second value is greater than a predetermined second threshold, the second value being obtained by dividing a length of the specific type dot in a sub-scan direction by a pixel length in the sub-scan direction corresponding to a selected one of the plurality of print resolutions to be used by the printing unit; and a dot data adjuster configured to adjust the dot data so as to regularly reduce the amount of ink for forming dots on the longitudinal contour line.

77. The printing apparatus in accordance with claim 76, wherein the dot data adjuster is configured to adjust the dot data so as to maintain the amount of ink for forming the specific dots at pixels, if at least one of two next pixels in the sub-scan direction to these pixels is not subject to dot formation.

78. The printing apparatus in accordance with claim 76, wherein the print unit is capable of printing images with a print resolution of 600 dpi or greater in the sub-scan direction; and the dot data adjuster is configured to adjust the dot data so as to reduce the amount of ink when printing is performed with a print resolution of 600 dpi or greater in the sub-scan direction.

79. The printing apparatus in accordance with claim 78, wherein the printing unit comprises a print head having at least one nozzle array in which a plurality of nozzles are aligned in the sub-scan direction at a nozzle pitch of 1/300th of an inch or less; and the dot data adjuster is configured to adjust the dot data so as to reduce the amount of ink when being ejected from the nozzle array.

80. The printing apparatus in accordance with claim 79, wherein the second threshold is 2.0; and the dot data adjuster is configured to adjust the dot data so as to reduce the amount of ink when the print medium is a plain paper.

81. The printing apparatus in accordance with claim 79, wherein the second threshold is 1.8; and the dot data adjuster is configured to adjust the dot data so as to reduce the amount of ink when the print medium is a plain paper.

82. The printing apparatus in accordance with claim 76, wherein the printing unit comprises a print head having a plurality of nozzles and a plurality of ejection driving elements for causing ejection of ink droplets respectively from the plurality of nozzles, each nozzle being adaptable to form a selected one of N different dots having different sizes at one pixel area on the print medium, N being an integer of at least 2, the N different dots including a specific size dot that is one of comparatively large dots among the N different dots; and the dot data adjuster is configured to adjust the dot data so as to reduce the amount of ink when the longitudinal contour line is formed with the specific size dot.

83. The printing apparatus in accordance with claim 76, wherein the dot data adjuster is configured to adjust the dot data so as to reduce the amount of ink when the print medium is a plain paper.

84. The printing apparatus in accordance with claim 76, wherein the dot data adjuster is configured to adjust the dot data so as to reduce the amount of ink by dot skipping.

85. The printing apparatus in accordance with claim 76, wherein the dot data adjuster is configured to adjust the dot data so as to reduce the amount of ink by reducing dot size.

86. The printing apparatus in accordance with claim 76, wherein the dot data adjuster is configured to adjust the dot data so as to reduce the amount of ink by selectively performing one of dot skipping and dot size reduction, depending on a pixel position of each dot within the specific image area.

87. A method of printing by forming ink dots with a printing unit capable of printing images on a print medium with one of a plurality of print resolutions, comprising the steps of:

(a) generating dot data from image data indicative of a image to be printed, the dot data representing a state of dot formation at each pixel;

(b) extracting a longitudinal contour line parallel to a sub-scan direction under a specific condition, the longitudinal contour line being a contour line of a specific type image area being composed of pixels at which specific type dots are to be formed according to the dot data, the specific condition being that a second value is greater than a predetermined second threshold, the second value being obtained by dividing a length of the specific type dot in a sub-scan direction by a pixel length in the sub-scan direction corresponding to a selected one of the plurality of print resolutions to be used by the printing unit; and (c) adjusting the dot data so as to regularly reduce the amount of ink for forming dots on the longitudinal contour line.

88. The method in accordance with claim 87, wherein the step(c) includes the step of adjusting the dot data so as to maintain the amount of ink for forming the specific dots at pixels, if at least one of two next pixels in the sub-scan direction to these pixels is not subject to dot formation.

89. The method in accordance with claim 87, wherein the print unit is capable of printing images with a print resolution of 600 dpi or greater in the sub-scan direction; and the step(c) includes the step of adjusting the dot data so as to reduce the amount of ink when printing is performed with a print resolution of 600 dpi or greater in the sub-scan direction.

90. The method in accordance with claim 89, wherein the printing unit comprises a print head having at least one nozzle array in which a plurality of nozzles are aligned in the sub-scan direction at a nozzle pitch of ⅓₀₀th of an inch or less; and the step(c) includes the step of adjusting the dot data so as to reduce the amount of ink when being ejected from the nozzle array.

91. The method in accordance with claim 90, wherein the second threshold is 2.0; and the step(c) includes the step of adjusting the dot data so as to reduce the amount of ink when the print medium is a plain paper.

92. The method in accordance with claim 90, wherein the second threshold is 1.8; and the step(c) includes the step of adjusting the dot data so as to reduce the amount of ink when the print medium is a plain paper.

93. The method in accordance with claim 87, wherein the printing unit comprises a print head having a plurality of nozzles and a plurality of ejection driving elements for causing ejection of ink droplets respectively from the plurality of nozzles, each nozzle being adaptable to form a selected one of N different dots having different sizes at one pixel area on the print medium, N being an integer of at least 2, the N different dots including a specific size dot that is one of comparatively large dots among the N different dots; and the step(c) includes the step of adjusting the dot data so as to reduce the amount of ink when the longitudinal contour line is formed with the specific size dot.

94. The method in accordance with claim 87, wherein the step(c) includes the step of adjusting the dot data so as to reduce the amount of ink when the print medium is a plain paper.

95. The method in accordance with claim 87, wherein the step(c) includes the step of adjusting the dot data so as to reduce the amount of ink by dot skipping.

96. The method in accordance with claim 87, wherein the step(c) includes the step of adjusting the dot data so as to reduce the amount of ink by reducing dot size.

97. The method in accordance with claim 87, wherein the step(c) includes the step of adjusting the dot data so as to reduce the amount of ink by selectively performing one of dot skipping and dot size reduction, depending on a pixel position of each dot within the specific image area.

98. A computer program product for causing a computer to generate print data to be supplied to a printing unit capable of printing images on a print medium with one of a plurality of print resolutions, the computer program product comprising:

a computer readable medium; and a computer program stored on the computer readable medium, the computer program comprising:

a first program for causing the computer to generate dot data from image data indicative of a image to be printed, the dot data representing a state of dot formation at each pixel;

a second program for causing the computer to extract a longitudinal contour line parallel to a sub-scan direction under a specific condition, the longitudinal contour line being a contour line of a specific type image area being composed of pixels at which specific type dots are to be formed according to the dot data, the specific condition being that a second value is greater than a predetermined second threshold, the second value being obtained by dividing a length of the specific type dot in a sub-scan direction by a pixel length in the sub-scan direction corresponding to a selected one of the plurality of print resolutions to be used by the printing unit; and a third program for causing the computer to adjust the dot data so as to regularly reduce the amount of ink for forming dots on the longitudinal contour line.

99. The computer program product in accordance with claim 98, wherein the third program is configured to adjust the dot data so as to maintain the amount of ink for forming the specific dots at pixels, if at least one of two next pixels in the sub-scan direction to these pixels is not subject to dot formation.

100. The computer program product in accordance with claim 98, wherein the print unit is capable of printing images with a print resolution of 600 dpi or greater in the sub-scan direction; and the third program is configured to adjust the dot data so as to reduce the amount of ink when printing is performed with a print resolution of 600 dpi or greater in the sub-scan direction.

101. The computer program product in accordance with claim 100, wherein the printing unit comprises a print head having at least one nozzle array in which a plurality of nozzles are aligned in the sub-scan direction at a nozzle pitch of ⅓₀₀th of an inch or less; and the third program is configured to adjust the dot data so as to reduce the amount of ink when being ejected from the nozzle array.

102. The computer program product in accordance with claim 101, wherein the second threshold is 2.0; and the third program is configured to adjust the dot data so as to reduce the amount of ink when the print medium is a plain paper.

103. The computer program product in accordance with claim 101, wherein the second threshold is 1.8; and the third program is configured to adjust the dot data so as to reduce the amount of ink when the print medium is a plain paper.

104. The computer program product in accordance with claim 98, wherein the printing unit comprises a print head having a plurality of nozzles and a plurality of ejection driving elements for causing ejection of ink droplets respectively from the plurality of nozzles, each nozzle being adaptable to form a selected one of N different dots having different sizes at one pixel area on the print medium, N being an integer of at least 2, the N different dots including a specific size dot that is one of comparatively large dots among the N different dots; and the third program is configured to adjust the dot data so as to reduce the amount of ink when the longitudinal contour line is formed with the specific size dot.

105. The computer program product in accordance with claim 98, wherein the third program is configured to adjust the dot data so as to reduce the amount of ink when the print medium is a plain paper.

106. The computer program product in accordance with claim 98, wherein the third program is configured to adjust the dot data so as to reduce the amount of ink by dot skipping.

107. The computer program product in accordance with claim 98, wherein
the third program is configured to adjust the dot data so as to reduce the amount of ink by reducing dot size.

108. The computer program product in accordance with claim 98, wherein
the third program is configured to adjust the dot data so as to reduce the amount of ink by selectively performing one of dot skipping and dot size reduction, depending on a pixel position of each dot within the specific image area.

109. A printing control apparatus for generating print data to be supplied to a printing unit to perform printing during main scans, the printing unit comprising a print head having a plurality of nozzles and a plurality of ejection driving elements for causing ejection of ink droplets respectively from the plurality of nozzles, each nozzle being adaptable to form a selected one of N different dots having different sizes at one pixel area on a print medium, N being an integer of at least 2, the N different dots including a specific size dot that is one of comparatively large dots among the N different dots, the printing control apparatus comprising:
- a dot data generator configured to generate dot data from image data indicative of a image to be printed, the dot data representing a state of dot formation at each pixel;
- a contour line extractor configured to extract a contour line of a specific type image area represented by the dot data, the specific type image area being composed of pixels at which specific size dots are to be formed; and
- a dot data adjuster configured to adjust the dot data so as to reduce an amount of ink on the contour line by reducing dot size when the contour line is formed with the specific size dot.

110. The printing control apparatus in accordance with claim 109, wherein
the contour line has a width of at least one pixel.

111. The printing control apparatus in accordance with claim 109, wherein
the dot data adjuster is configured to adjust the dot data so as to further regularly reduce the amount of ink for forming dots at pixels adjacent to the contour line within the specific type image area.

112. A printing apparatus for forming ink dots with a printing unit to perform printing during main scans, the printing apparatus comprising:
the printing unit comprising a print head having a plurality of nozzles and a plurality of ejection driving elements for causing ejection of ink droplets respectively from the plurality of nozzles, each nozzle being adaptable to form a selected one of N different dots having different sizes at one pixel area on a print medium, N being an integer of at least 2, the N different dots including a specific size dot that is one of comparatively large dots among the N different dots; and
a print control apparatus, the print control apparatus comprising:
- a dot data generator configured to generate dot data from image data indicative of a image to be printed, the dot data representing a state of dot formation at each pixel;
- a contour line extractor configured to extract a contour line of a specific type image area represented by the dot data, the specific type image area being composed of pixels at which specific size dots are to be formed; and
- a dot data adjuster configured to adjust the dot data so as to reduce an amount of ink on the contour line by reducing dot size when the contour line is formed with the specific size dot.

113. The printing control apparatus in accordance with claim 112, wherein
the contour line has a width of at least one pixel.

114. The printing control apparatus in accordance with claim 112, wherein
the dot data adjuster is configured to adjust the dot data so as to further regularly reduce the amount of ink for forming dots at pixels adjacent to the contour line within the specific type image area.

115. A method of printing by forming ink dots with a printing unit to perform printing during main scans, the method comprising the steps of:
(a) providing a print head having a plurality of nozzles and a plurality of ejection driving elements for causing ejection of ink droplets respectively from the plurality of nozzles, each nozzle being adaptable to form a selected one of N different dots having different sizes at one pixel area on a print medium, N being an integer of at least 2, the N different dots including a specific size dot that is one of comparatively large dots among the N different dots; and
(b) generating dot data from image data indicative of a image to be printed, the dot data representing a state of dot formation at each pixel;
(c) extracting a contour line of a specific type image area represented by the dot data, the specific type image area being composed of pixels at which specific size dots are to be formed; and
(d) adjusting the dot data so as to reduce an amount of ink on the contour line by reducing dot size when the contour line is formed with the specific size dot.

116. The method in accordance with claim 115, wherein
the contour line has a width of at least one pixel.

117. The method in accordance with claim 115, wherein
the step(c) includes the step of adjusting the dot data so as to further regularly reduce the amount of ink for forming dots at pixels adjacent to the contour line within the specific type image area.

118. A computer program product for causing a computer to generate print data to be supplied to a printing unit to perform printing during main scans, the printing unit comprising a print head having a plurality of nozzles and a plurality of ejection driving elements for causing ejection of ink droplets respectively from the plurality of nozzles, each nozzle being adaptable to form a selected one of N different dots having different sizes at one pixel area on a print medium, N being an integer of at least 2, the N different dots including a specific size dot that is one of comparatively large dots among the N different dots;
a computer readable medium; and
a computer program stored on the computer readable medium, the computer program comprising:
a first program for causing the computer to generate dot data from image data indicative of a image to be printed, the dot data representing a state of dot formation at each pixel;
a second program for causing the computer to extract a contour line of a specific type image area represented by the dot data, the specific type image area being composed of pixels at which specific size dots are to be formed; and a third program for causing the computer to adjust the dot data so as to reduce an amount of ink on the contour line by reducing dot size when the contour line is formed with the specific size dot.

119. The computer program product in accordance with claim 118, wherein the contour line has a width of at least one pixel.

120. The computer program product in accordance with claim 118, wherein the third program is configured to adjust the dot data so as to further regularly reduce the amount of ink for forming dots at pixels adjacent to the contour line within the specific type image area.

121. An ink-jet recording apparatus for ejecting inks of different colors from a plurality of nozzles provided on a recording head to form images on a recording medium, the ink-jet recording apparatus comprising:

a contour extraction means for extracting a contour of a non-picture image area to be recorded;

a skipping means for skipping some of recording pixels adjacent to the contour line within the non-picture image area; and a dot size assignment means for dividing the non-picture image area into a skipped area and a non-skipped area, assigning comparatively small dots to the skipped area, and assigning comparatively large dots to the non-skipped area.

122. An ink-jet recording apparatus in accordance with claim 121, wherein the contour extraction means is configured to extract the contour as a set of recording pixels that has a width of at least one pixel.

123. An ink-jet recording apparatus in accordance with claim 121, wherein the skipping means is configured to skip recording pixels in a pixel layer having a width of at least one recording pixel adjacent to the contour within the non-picture image area.

124. A computer-readable storage medium, available for an ink-jet recording apparatus comprising a computer and a recording head to form images on a recording medium, the medium is configured to store a computer program causing the ink-jet recording apparatus to print images on recording paper by using the recording head, the computer program comprising:

a first computer program causing the computer to extract a contour of a non-picture image area to be recorded;

a second computer program causing the computer to skip some of recording pixels adjacent to the contour line within the non-picture image area; and a third computer program causing the computer to divide the non-picture image area into a skipped area and a non-skipped area, assigning comparatively small dots to the skipped area, and assigning comparatively large dots to the non-skipped area.

125. A computer-readable storage medium in accordance with claim 124, wherein the first program is configured to extract the contour as a set of recording pixels that has a width of at least one pixel.

126. A computer-readable storage medium in accordance with claim 124, wherein the second program is configured to skip recording pixels in a pixel layer having a width of at least one recording pixel adjacent to the contour within the non-picture image area.

* * * * *